(12) United States Patent
Numata

(10) Patent No.: US 9,937,638 B2
(45) Date of Patent: Apr. 10, 2018

(54) DUST COLLECTION COVER FOR CUTTING DEVICES

(71) Applicant: MAKITA CORPORATION, Anjo-shi, Aichi (JP)

(72) Inventor: Fumitoshi Numata, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 31 days.

(21) Appl. No.: 15/176,468

(22) Filed: Jun. 8, 2016

(65) Prior Publication Data

US 2016/0368165 A1 Dec. 22, 2016

(30) Foreign Application Priority Data

Jun. 18, 2015 (JP) ................. 2015-123193
Jun. 18, 2015 (JP) ................. 2015-123195
Jun. 18, 2015 (JP) ................. 2015-123196

(51) Int. Cl.
| | |
|---|---|
| B26D 7/08 | (2006.01) |
| B26D 5/00 | (2006.01) |
| B27B 5/00 | (2006.01) |
| B27B 27/06 | (2006.01) |
| B27B 5/18 | (2006.01) |
| B28D 7/02 | (2006.01) |
| B23D 59/00 | (2006.01) |
| B23D 45/16 | (2006.01) |
| B28D 1/04 | (2006.01) |

(52) U.S. Cl.
CPC ............. *B28D 7/02* (2013.01); *B23D 45/16* (2013.01); *B23D 59/006* (2013.01); *B28D 1/045* (2013.01)

(58) Field of Classification Search
CPC .......... B28D 7/02; B28D 1/045; B23D 45/16; B23D 59/006
USPC ........ 83/168, 397, 471.3, 473, 477.2, 471.1, 83/471.2, 483–490, 581
See application file for complete search history.

(56) References Cited

U.S. PATENT DOCUMENTS

| | | | | |
|---|---|---|---|---|
| 4,150,598 A | * | 4/1979 | Berends | B23Q 11/08 83/440.2 |
| 4,255,995 A | * | 3/1981 | Connor | B23D 59/006 144/252.1 |
| 5,129,300 A | * | 7/1992 | Kawakami | B27G 19/02 30/391 |
| 5,782,153 A | * | 7/1998 | Sasaki | B23D 59/006 83/162 |
| 6,748,660 B2 | * | 6/2004 | Buser | B23Q 11/0046 125/12 |
| 8,522,656 B2 | * | 9/2013 | Kani | B27B 5/29 83/471.3 |
| 8,887,606 B2 | * | 11/2014 | Inai | B23D 45/048 83/397 |

(Continued)

FOREIGN PATENT DOCUMENTS

JP    2007-030314 A    2/2007

*Primary Examiner* — Ghassem Alie
*Assistant Examiner* — Bharat C Patel
(74) *Attorney, Agent, or Firm* — Oliff PLC

(57) ABSTRACT

A compression spring is retained in a spring retaining portion provided in a fixing cover. By a pressing portion formed in a main body cover, the compression spring can be pressed to generate a biasing force in an opening direction of the main body cover. The compression spring is retained in the spring retaining portion. Accordingly, the fixing cover and main body cover can be easily assembled.

6 Claims, 18 Drawing Sheets

(56) References Cited

U.S. PATENT DOCUMENTS

| | | | | |
|---|---|---|---|---|
| 9,101,993 | B2* | 8/2015 | Yokota | B23D 59/006 |
| 9,278,427 | B2* | 3/2016 | Numata | B24B 23/02 |
| 2008/0244910 | A1* | 10/2008 | Patel | B23D 45/122 |
| | | | | 30/123 |
| 2011/0056084 | A1* | 3/2011 | Okada | B23D 59/002 |
| | | | | 30/376 |
| 2011/0214546 | A1* | 9/2011 | Inayoshi | B26D 7/18 |
| | | | | 83/168 |

* cited by examiner

DUST COLLECTION COVER FOR CUTTING DEVICES

CROSS-REFERENCE

This application claims priority to Japanese patent application serial number 2015-123193, filed on Jun. 18, 2015, Japanese patent application serial number 2015-123195, filed on Jun. 18, 2015, and Japanese patent application serial number 2015-123196, filed on Jun. 18, 2015, the contents of which are incorporated herein by reference in its entirely.

TECHNICAL FIELD

The present invention generally relates to a dust collection cover (a dust collector) of a cutting device (a cutter) used for, for example, cutting and/or grooving a stone material or a concrete block, or cutting an asphalt road surface.

BACKGROUND ART

During cutting operations discussed above, a large amount of dusts and/or debris may be generated from cutting area. In order to satisfactorily maintain a working environment, it is necessary to prevent the generated dusts and/or debris from being scattered around. Owing to this, during the cutting operations, a dust collection cover (a dust collector) is attached to a cutting device. A technique relating to the dust collection cover (dust collector) is disclosed in the following patent documents.

Japanese Laid-Open Patent Publication No. 2007-30314 discloses a dust collection cover which supports a cutting device having a rotary cutting blade such as a diamond cutter so as to be vertically moved with respect to a fixing cover supported on a base with which a cutting surface of a material to be cut is brought into contact. According to this dust collection cover, a grooving operation or a cutting operation can be performed by moving the rotary cutting blade within the fixing cover downward so as to protrude below a bottom surface of the base and then cutting a material to be cut with the protruding portion of the rotary cutting blade. This type of cutting is called a plunge cut.

U.S. Patent Publication No. 2008-0244910 discloses a dust collection cover used for the same kind of a cutting device, especially a dust collection cover with a double structure which supports a main body cover attached to a cutting device so as to be moved in an upward and downward direction with respect to a fixing cover supported on a base with which a cutting surface of a material to be cut is brought into contact. In the dust collection cover with the double structure, a cutting operation such as grooving can be performed by moving the cutting device together with the main body cover downwards so as to protrude the rotary cutting blade below a bottom surface of the base and then cutting a cutting surface of a material to be cut with the protruding cutting blade. According to the dust collection cover with the double structure, the main body cover is overlapped with the fixing cover, and accordingly, compared to the former dust collection cover, a higher sealability (high dust collection efficiency and/or strong dust collection power) of the dust collection cover with respect to the dusts and/or debris generated around a tip of the rotary cutting blade can be obtained along an overall vertical movable range of the rotary cutting blade.

However, it has been necessary to further improve the above latter dust collection cover with the double structure. In the prior art disclosed in U.S. Patent Publication No. 2008-0244910, it is configured that the main body cover is supported so as to be rotated via a rotary support shaft in front of the fixing cover and that the main body cover (the cutting device) is biased toward an upward direction (in a direction such that the rotary cutting blade does not protrude below the bottom surface of the base) by a torsion spring attached to or around the rotary support shaft. Because the torsion spring for biasing the main body cover (the cutting device) is attached to or around the rotary support shaft, it may be difficult to set a rotation range of the cutting device to be large. When the cutting device is returned to an upper position, the rotary cutting blade is covered with the fixing cover and the main body cover.

Because of this construction, when replacing the rotary cutting blade, the rotary support shaft and the torsion spring must be disassembled to separate the cutting blade from the fixing cover together with the main body cover. Thus, when attaching the main body cover to the fixing cover after the rotary cutting blade is replaced, it may take time to reassemble the torsion spring in a predetermined condition, which may be awkward and troublesome for a user. In this respect, it has been necessary to improve operability in replacing the rotary cutting blade.

Thus, regarding the dust collection cover with the double structure, in which a cutting area of the material to be cut is covered with the fixing cover and the main body cover, there is a need in the art to improve operability mainly in replacing the rotary cutting blade.

Furthermore, according to the dust collection cover in the above prior art, it may not be possible to finely adjust a cutting depth of the rotary cutting blade with respect to a cutting surface of the material to be cut. Thus, there is a need in the art to improve operability in adjusting the cutting depth with respect to a cutting surface of the material to be cut in a cutting device referred to as a plunge cutter, or more specifically, in a cutting device having a dust collection cover with the double structure in which a cutting area of the material to be cut is covered with the fixing cover and the main body cover.

Furthermore, the dust collection cover in the above prior art has not provided with a mechanism for easily and reliably locking an opening/closing operation of the main body cover with respect to the fixing cover at an arbitrary (opening/closing) angle. Thus, there is a need in the art to easily and reliably lock the main body cover with respect to the fixing cover at an arbitrary (opening/closing) angle.

SUMMARY OF THE INVENTION

In a first aspect of the present teachings, a dust collection cover for covering around a rotary cutting blade of a cutting device is disclosed, wherein the dust collection cover has a main body cover (first cover) to which the cutting device is attached, and also has a fixing cover (second cover) having a base with which a cutting surface of a material to be cut is brought into contact. Furthermore, the fixing cover (second cover) is coupled to the main body cover (first cover) in a front part of the cutting device in a direction where a cutting operation is progressed, such that the main body cover (first cover) is relatively opened and closed with respect to the fixing cover (second cover) around a rotation support shaft, and the fixing cover (second cover) is biased toward an opening direction by a compression spring so as to be opened with respect to the main body cover (first cover). Furthermore, the compression spring is retained so as to be expanded and contracted along an arc centered on the rotary support shaft.

According to the first aspect, the compression spring that can bias the main body cover (first cover) in an opening direction with respect to the fixing cover (second cover) is retained so as to be expanded and contracted along the arc centered on the rotation support shaft. Accordingly, when the main body cover (first cover) is separated from the fixing cover (second cover) and after the separation the main body cover (first cover) is coupled to the fixing cover (second cover) again, the compression spring will not have to be reassembled in a predetermined installation state. In this respect, operability in exchanging the rotary cutting blade can be improved. Furthermore, since the compression spring is retained so as to be expanded and contracted along the arc centered on the rotation support shaft, an expansion and contraction direction of the compression spring corresponds to an opening/closing direction of the fixing cover (second cover) with respect to the main body cover (first cover). Thus, a contact position of an upper end of the compression spring with respect to the main body cover (first cover) may not be changed, and also a biasing direction of the compression spring with respect to the fixing cover (second cover) and the main body cover (first cover) may be the same all the time. Accordingly, a biasing force in the opening direction may be stably applied to both the main body cover (first cover) and the fixing cover (second cover).

In another aspect of the present teachings, the compression spring is retained opposite to the rotation support shaft with respect to a rotation center of the rotary cutting blade.

According to this aspect, the compression spring is located far from the rotary support shaft compared to a configuration in which the compression spring is located at a side of the rotary support shaft with respect to the rotation center of the rotary cutting blade. Accordingly, the compression spring that is long in length and large in an expansion and contraction amount can be easily positioned, and thus a degree of freedom in designing the compression spring can be improved.

In another aspect of the present teachings, the compression spring is retained opposite to the rotary cutting blade in a thickness direction of the rotary cutting blade.

According to this aspect, an area for retaining the compression spring (spring retaining portion) may be easily obtained and/or ensured.

In another aspect of the present teachings, the compression spring is retained in a spring retaining portion provided in the fixing cover (second cover).

According to this aspect, the compression spring may be retained at a side of the fixing cover (second cover). Accordingly, one end of the compression spring can be pressed by, for example, a pressing portion provided at a side of the main body cover (first cover). By an opening/closing operation of the main body cover (first cover) with respect to the fixing cover (second cover), a relative position of the pressing portion may be relatively changed with respect to the compression spring, and accordingly the compression spring can be expanded and/or contracted. Thus, a biasing force can be applied in an opening direction of the main body cover (first cover) with respect to the fixing cover (second cover).

In another aspect of the present teachings, the spring retaining portion includes a removal prevention portion for preventing removal of the compression spring.

According to this aspect, even when the main body cover (first cover) is separated from the fixing cover (second cover) during an exchange of the rotary cutting blade, the compression spring remains in the spring retaining portion provided in the fixing cover (second cover). Accordingly, when the two covers are to be coupled to each other again, the compression spring will not have to be re-assembled to the spring retaining portion. In this respect, operability in exchanging the rotary cutting blade can be improved.

In another aspect of the present teachings, the main body cover (first cover) includes a pressing portion for generating a biasing force to the compression spring, and the pressing portion is entered within the spring retaining portion through a pressing portion entering path provided in the removal prevention portion of the spring retaining portion such that the pressing portion presses one end of the compression spring.

According to this aspect, when the fixing cover (second cover) is coupled to the main body cover (first cover) again, an operation for bringing the pressing portion into contact with the one end of the compression spring can be easily performed.

In another aspect of the present teachings, a cutting depth adjustment stopper is provided between the main body cover (first cover) and the fixing cover (second cover) such that an opening/closing angle in a closing direction of the main body cover (first cover) with respect to the fixing cover (second cover) is configured to be positioned at a plurality of positions to adjust a cutting depth of the rotary cutting blade with respect to the cutting surface of the material to be cut.

According to this aspect, an opening/closing angle of the fixing cover (second cover) with respect to the main body cover (first cover) in a closing direction can be positioned at a plurality of positions, and thus a cutting depth with respect to a cutting surface of the rotary cutting blade can be finely adjusted. Accordingly, operability in the cutting device can be improved.

In another aspect of the present teachings, a fixing stopper for locking a rotation of the main body cover (first cover) with respect to the fixing cover (second cover) at an arbitrary position is provided between the main body cover (first cover) and the fixing cover (second cover).

According to this aspect, by a simple operation of the fixing stopper, a rotation of the main body cover (first cover) with respect to the fixing cover (second cover) may be locked at an arbitrary angle. Thus, a protruding amount of the rotary cutting blade below a lower surface of the base (a cutting depth with respect to a cutting surface) may be arbitrarily fixed. By fixing a protruding amount of the rotary cutting blade by the fixing stopper in the first place, then the rotary cutting blade can be cut into the cutting surface of the material to be cut from its edge and the rotary cutting blade can be moved along the cutting surface. In this way, a cutting operation can be performed precisely and rapidly, and thus operability of the cutting device can be improved.

In another aspect of the present teachings, the cutting device has the dust collection cover according to the above-described dust collection cover.

According to this aspect, the cutting device has the effects discussed above, and thus operability of the cutting device can be improved.

DETAILED DESCRIPTION OF EMBODIMENTS

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures, components and/or devices are shown in block diagram form in order to avoid obscuring significant aspects of the exemplary embodiments presented herein.

Hereinafter, an embodiment of the present teachings will be described with reference to FIGS. 1 to 18. As shown in FIGS. 1 to 7, a dust collection cover 20 in accordance with the embodiment, which may be attached to a cutting device 2 for cutting and grooving a stone material and/or a concrete block, or cutting an asphalt road surface, can prevent the dusts and/or debris generated by a cutting operation from being scattered around. The cutting device 2 may be the same as before, and accordingly a modification may not particularly be necessary. In the following description, the cutting device 2 will be simply explained.

Figure 10:
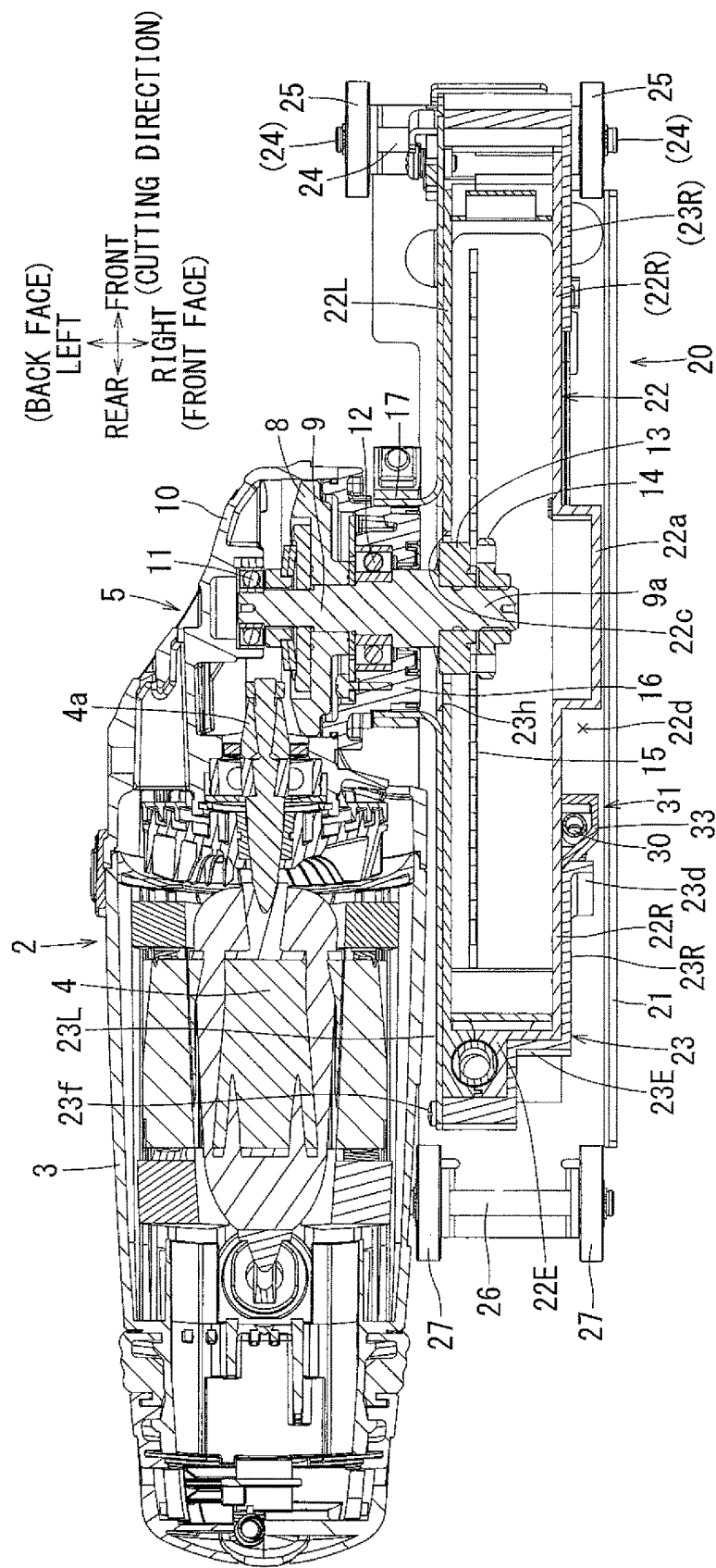
FIG. 10 is a cut-away view of the dust collection cover and the cutting device, which is viewed from the top.

FIG. 10 shows an internal structure of the cutting device 2. The cutting device 2 may be supported by a back face of the dust collection cover 20. Similarly to a disc grinder, the cutting device 2 may have a configuration in which an electric motor 4 is housed in a cylindrical tubular main body housing 3. A gear head 5 may be coupled to a front part of the main body housing 3. As shown in FIGS. 1 to 7, a handle 6 that a user holds and/or grips may be coupled to a rear part of the main body housing 3. A switch lever 6a may be located in a lower surface of the handle 6. A pulling operation of the switch lever 6a in an upward direction, which is made by use of a fingertip of the user's hand by which the switch lever 6a is held, may activate the electric motor 4. A power cord 7 for supplying power may be pulled out from a rear part of the handle 6.

As shown in FIG. 10, a drive gear 4a linked to an output shaft of the electric motor 4 may be engaged with a bevel gear as a driven gear 8. The driven gear 8 may be linked to a spindle 9. The spindle 9 may be rotatably supported around an axis perpendicular to the output shaft of the electric motor 4. The spindle 9 may be rotatably supported by a gear head housing 10 via bearings 11 and 12. A tip part of the spindle 7 may protrude toward within the dust collection cover 20 from the gear head housing 10. A circular rotary cutting blade 15 may be attached to the protruding portion. The rotary cutting blade 15 may be a cutter referred to as a diamond wheel, and may be rotated, for example, in a counterclockwise direction as shown in a void arrow in FIG. 2. As shown in FIG. 10, the rotary cutting blade 15 may be held and/or sandwiched between an inner flange 13 and an outer flange 14, and may be fixed to a screw shaft 9a of the spindle 9. Furthermore, the rotary cutting blade 15 can be removed from the spindle 9 by disconnecting the outer flange 14 from the screw shaft 9a (by loosening a screw-joining of the outer flange 14 with respect to the screw shaft 9a).

Figure 2:
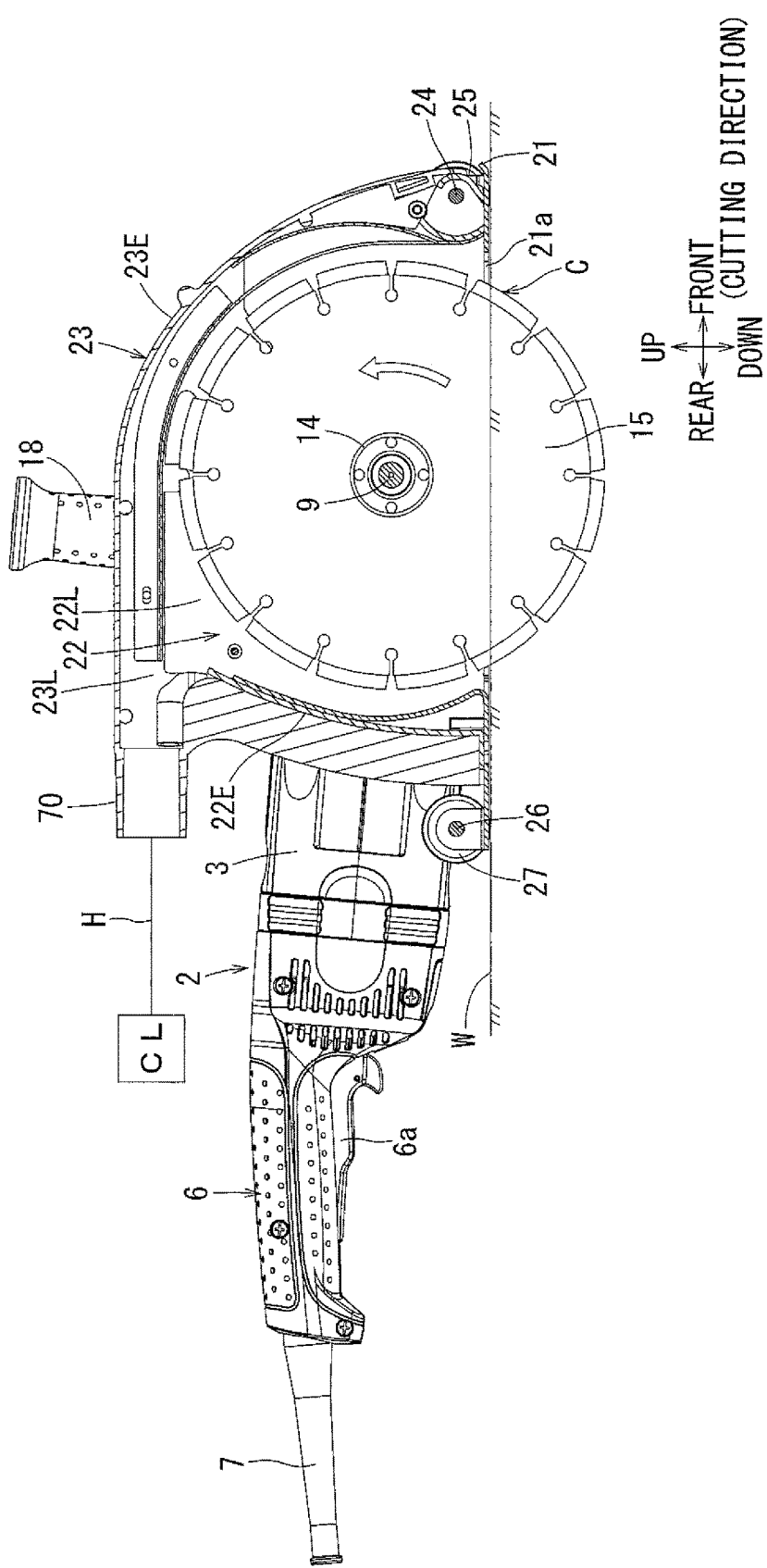
FIG. 2 is a partial vertical cut-away view of the dust collection cover in a state where the main body cover is located in the lower end.
Figure 8:
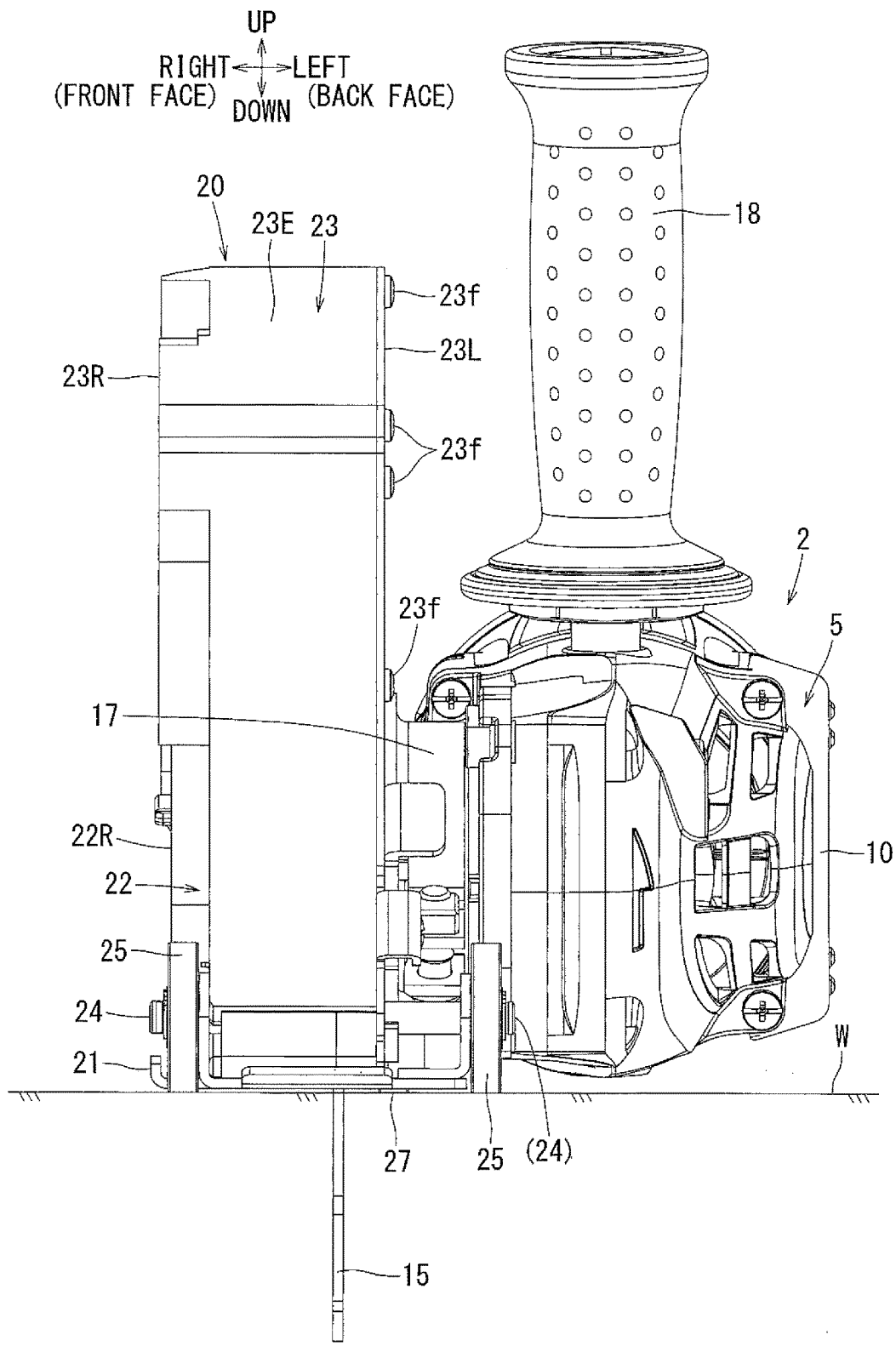
FIG. 8 is a view of the dust collection cover and the cutting device, which is viewed from a direction indicated by an arrow (VIII) in FIG. 7.

The bearing 12 that rotatably supports the spindle 9 may be held by a bearing holder 16. The bearing holder 16 may be fixed at an opening of the gear head housing 10. Furthermore, the dust collection cover 20 may be coupled to the cutting device 2 by tightening a cramp portion 17 around an outer circumference of the bear holder 16. As described later, the cutting device 2 may be coupled to the main body cover 23 of the dust collection cover 20. As shown in FIGS. 2, 8, and 10, the cutting device 2 may be mounted on the back face (an outer wall 23L) of the main body cover 23 such that the cutting device 2 may be disposed extending (lying) along a front and rear direction with the axis of the spindle (output axis) extending along a left and right direction.

Figure 7:
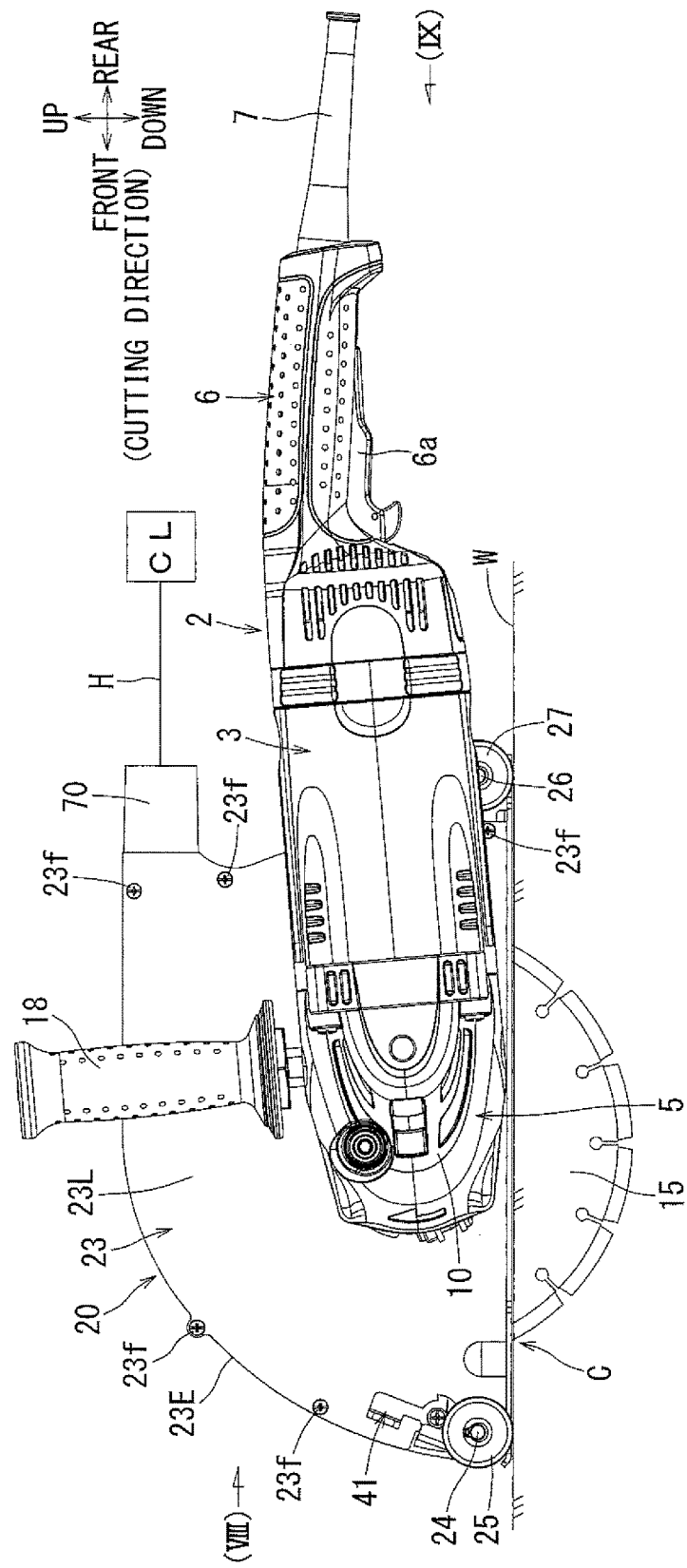
FIG. 7 is a back view of the dust collection cover and the cutting device, which is viewed from a direction indicated by an arrow (VII) in FIG. 5.
Figure 9:
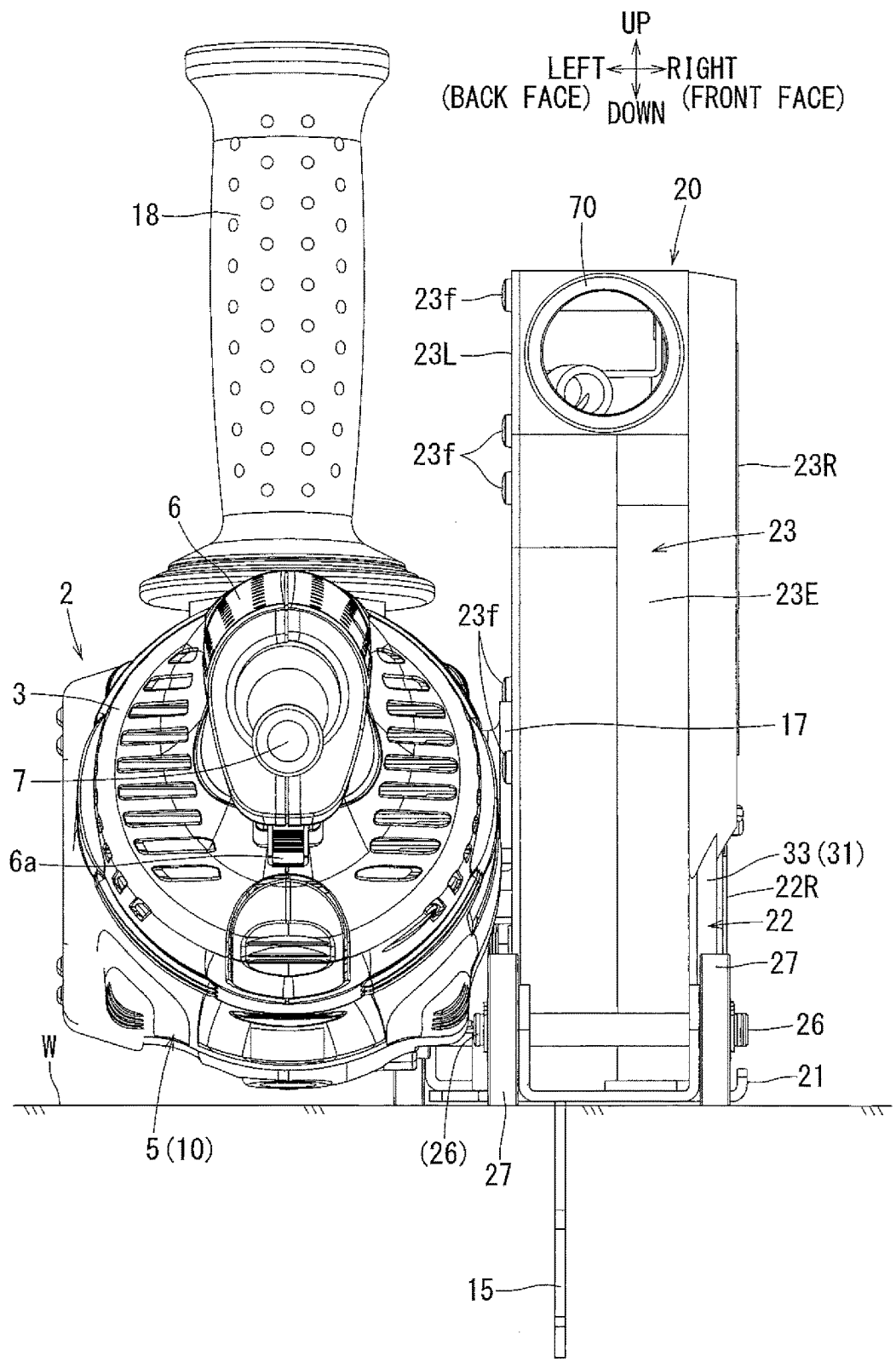
FIG. 9 is a view of the dust collection cover and the cutting device, which is viewed from a direction indicated by an arrow (IX) in FIG. 7.

As shown in FIGS. 7 to 9, a front grip 18 may be disposed on an upper face of the gear head housing 10. The user may hold the handle 6 by one hand and the front grip 18 by another hand to hold the cutting device 2 in a stable manner and/or posture. Accordingly, a cutting operation can be precisely and rapidly performed.

The dust collection cover 20 may have a main function of preventing the dusts and/or debris generated at a cutting position C from being scattered around by blocking a right side, a left side, and an upper circumference side of the rotary cutting blade 15. As shown in FIGS. 1 to 7, the dust collection cover 20 may have a steel base 21 that may be brought into contact with a cutting surface W of the material to be cut, a resin fixing cover 22 that may be fixed to the base 21, and a main body cover 23 that may be supported so as to be rotated in an upward and downward direction with respect to the fixing cover 22. The main body cover 23 may be supported so as to be rotated with respect to the fixing cover 22 in the upward and downward direction via a rotary support shaft 24. The rotary support shaft 24 may also be used for an axle of a front wheel 25 (front wheel shaft). The front wheel 25 may be attached to both left and right ends of the rotary support shaft 24. Each of the left and right front wheels 25 may be brought into contact with the cutting surface W of the material to be cut.

Figure 6:
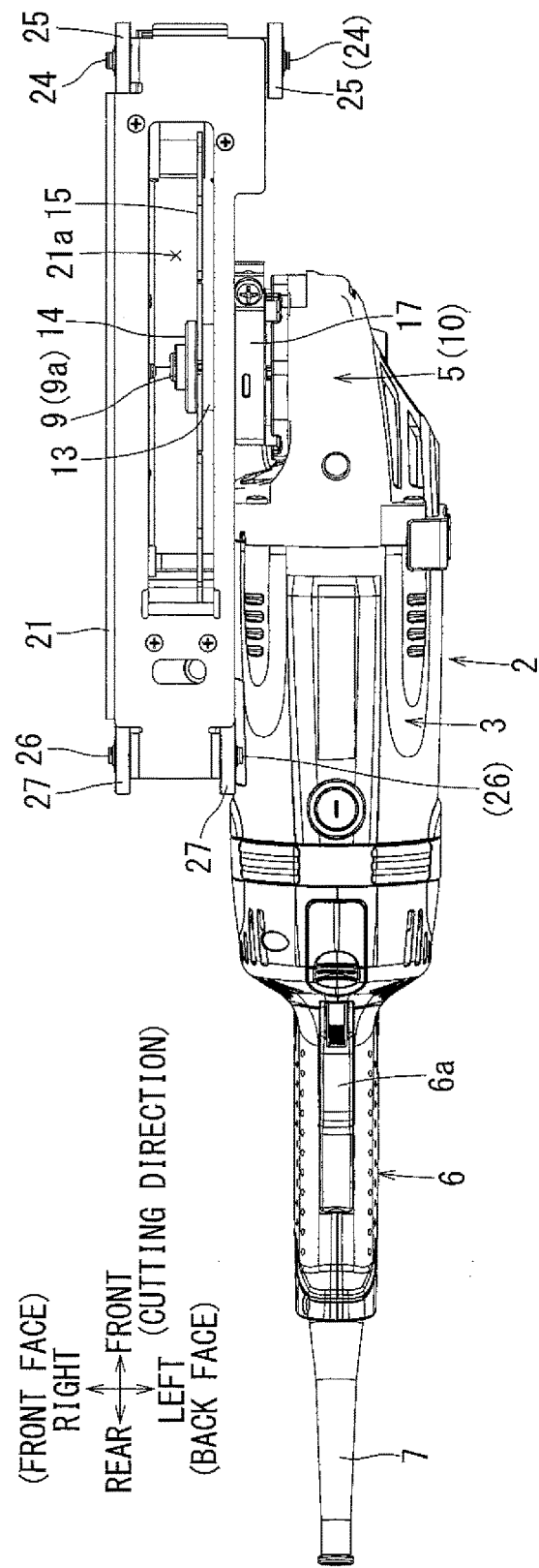
FIG. 6 is a bottom view of the dust collection cover and the cutting device, which is viewed from a direction indicated by an arrow (VI) in FIG. 1.

A rear wheel shaft 26 may be supported around a rear end of the base 21. The rear wheel shaft 26 may be disposed parallel to the rotary support shaft 24 and rotatably supported extending in a left and right width direction. A rear wheel 27 may be attached to both left and right ends of the rear wheel shaft 26. Each of the left and right rear wheels 27 may be brought into contact with the cutting surface W of the material to be cut. By the left and right front wheels 25 and the left and right rear wheels 27, the base 21 may be disposed in a slightly floated manner with respect to the cutting surface W, and accordingly the base 21 may be smoothly moved along the cutting surface W. As shown in FIGS. 2 and 6, a rectangular window 21a may be provided in the center of the base 21. A lower part of the rotary cutting blade 15 may protrude below a lower surface of the base 21 through the window 21a.

As shown in, for example, FIG. 10, the fixing cover 22 that is attached and/or fixed to the upper surface of the base 21 may have inner walls 22L and 22R rising from a left side and a right side of the window 21a, respectively, and extending upward to cover mainly both the left and right sides of the rotary cutting blade 15. Furthermore, the fixing cover 22 may also have an inner peripheral part 22E that connects rear portions of the left and right inner walls 22L and 22R to cover mainly a rear part of the rotary cutting blade 15. As shown in, for example, FIG. 10, the main body cover 23 to which the cutting device 2 is attached may have a left outer wall 23L and a right outer wall 23R that are respectively disposed outside the left and right inner walls 22L and 22R, and also may have an outer peripheral part 23E that connects front and rear end portions of the left and right outer walls 23L and 23R to cover approximately an upper half circumference of the rotary cutting blade 15. As shown in FIGS. 10, 12, 13, 15, and 16, a relief part 22c of an elongated hole that can pass through the spindle 9 of the cutting device 2 may be formed in the left inner wall 22L of the fixing cover 22. The relief part 22c of an elongated hole may be formed in a curved manner, more specifically, in circular arc shape centering on the rotary support shaft 24.

Furthermore, the relief part 22c may be open at an upper portion of the inner wall 22L.

The right side (front face side) outer wall 23R and the outer peripheral part 23E of the main body cover 23 may be made from resin. On the other hand, the left side (back face side) outer wall 23L of the main body cover 23 may be made from steel plate. As shown in FIG. 7, the left side outer wall 23L may be screwed and connected to left edge part of the resin outer peripheral part 23E by fixing screws 23f at plurality places. The cramp portion 17 for connecting the cutting device 2 may be connected to the left side outer wall 23L by welding. As shown in FIG. 10, in correspondence with an inner peripheral hole of the cramp 17, a circular relief hole 23h may be provided in the left side outer wall 23L of the main body cover 23. The spindle 9 may protrude toward within the dust collection cover 20 through the relief hole 23h of the main body cover 23 and the relief part 22c of the fixing cover 22. The cutting device 2 can be removed from the dust collection cover 20 by removing the spindle 9 from the rotary cutting blade 15 and loosening the cramp portion 17.

Figure 15:
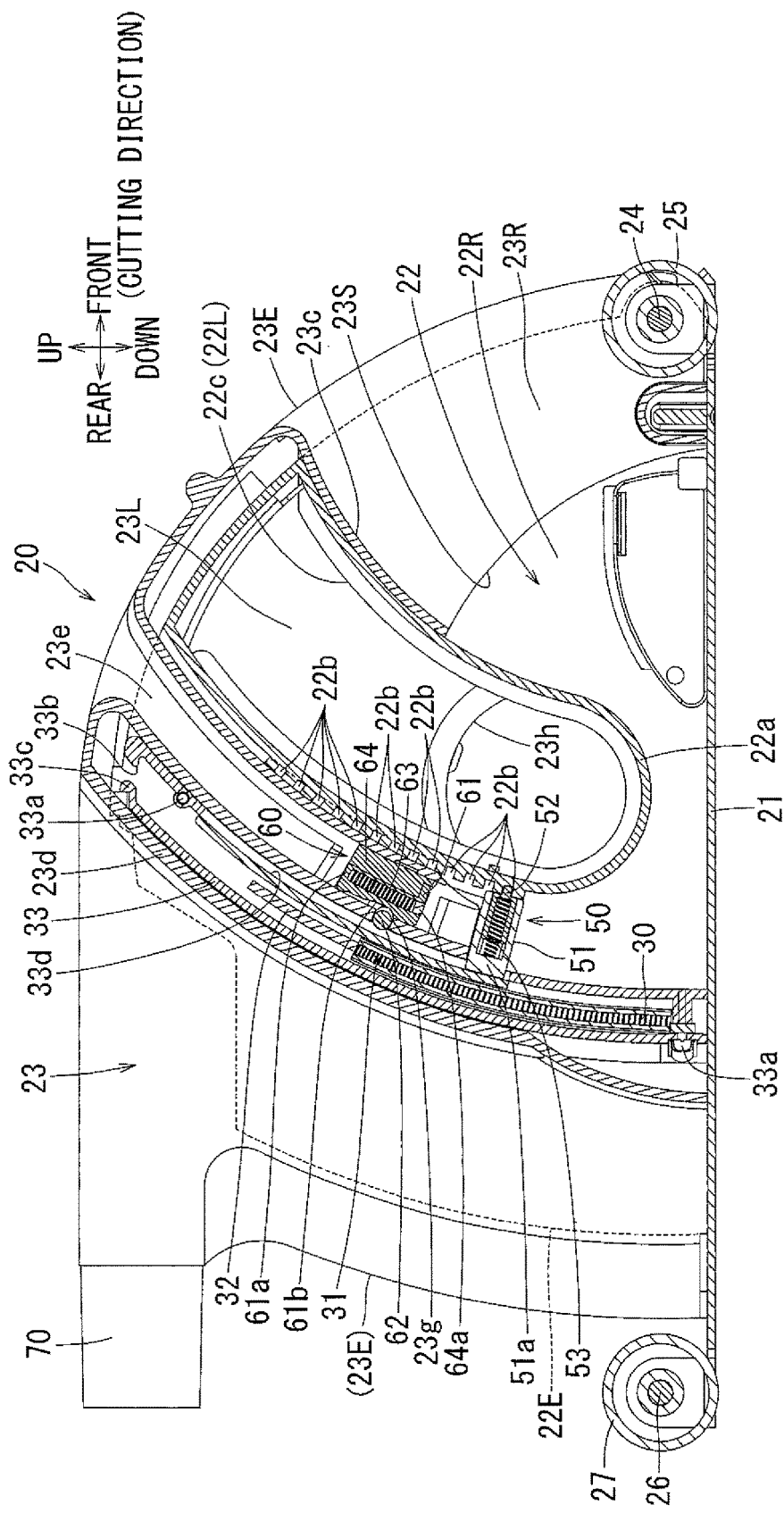
FIG. 15 is another front view of the dust collection cover, which is a partial cut-away view taken along the line (XV)-(XV) in FIG. 5, showing that the main body cover is completely closed (located in a lower end) with respect to a fixing cover with the cutting device removed for clarity.
Figure 16:
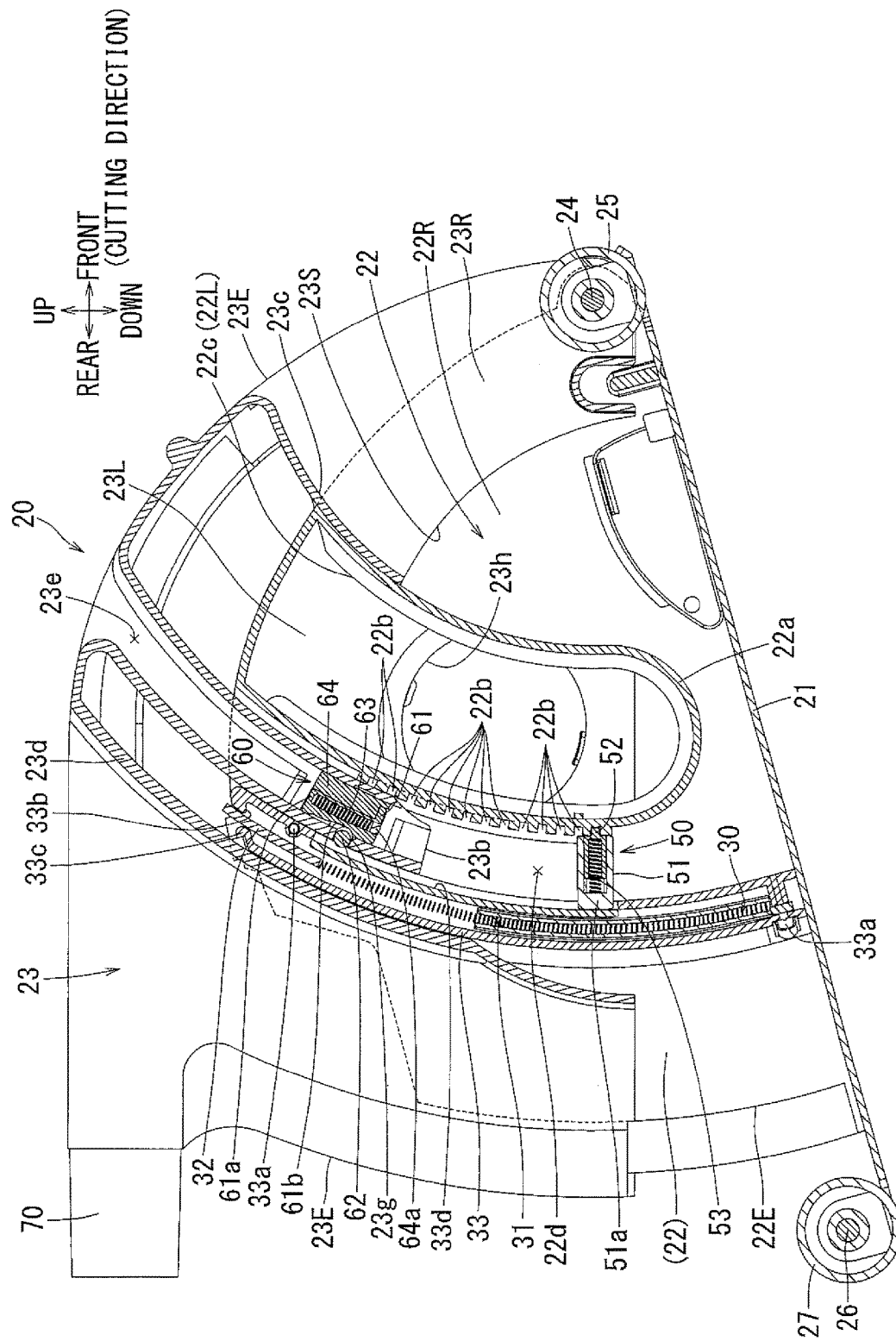
FIG. 16 is another front, and partial cut-away view of the dust collection cover with the cutting device removed for clarity, showing a state where the main body cover is operated to be opened in an upward direction from a state shown in FIG. 15.

The main body cover 23 may be biased by a compression spring 30 in a direction such that the main body cover 23 rotates upward with respect to the fixing cover 22. As shown in FIGS. 15 and 16, the compression spring 30 may be retained in the right side inner wall 22R of the fixing cover 22, more specifically, within a spring holder 33 (in a spring retaining portion 31) that is attached to the right side of the fixing cover 22 and is located opposite to the cutting device 2 with respect to the rotary cutting blade 15. The spring holder 33 may be attached to the fixing cover 22 along an arc centered on the rotary support shaft 24 of the main body cover 23. Furthermore, the spring holder 33 may be attached to the fixing cover 22 on the opposite side of the rotary support shaft 24 with respect to the rotation center (spindle 9) of the rotary cutting blade 15. The compression spring 30 may be retained by the spring holder 33 (the spring retaining portion 31) so as to be expanded and contracted, along the arc centered on the rotary support shaft 24 in an area opposite to the rotary support shaft 24 with respect to the rotation center (spindle 9) of the rotary cutting blade 15.

As shown in FIG. 15, the spring holder 33 may be fixed to the right side inner wall 22R of the fixing cover 22 by using two fixing screws 33a. A removal prevention portion 33c for preventing the compression spring 30 from coming out of the spring holder 33 may be formed at an upper part of the spring holder 33 (of the fixing cover 22). A pressing portion 32 for pressing the compression spring 30 may be formed in the main body cover 23 as shown in FIG. 15, and a pressing portion entering path 33b for passing through the pressing portion 32 may be fanned at the removal prevention portion 33c as shown in FIG. 16. The pressing portion 32 may be integrally formed with an inner surface of the right side outer wall 23R of the main body cover 23, Furthermore, the pressing portion 32 may be formed in a curved manner, i.e., in a circular shape centering on the rotary support shaft 24.

When the main body cover 23 is rotated in the upward and downward direction with respect to the fixing cover 22, the pressing portion 32 may be moved within the spring holder 33 in the upward and downward direction together with the main body cover 23. When the main body cover 23 is rotated downward, an upper end part of the compression spring 30 is pressed downward by the pressing portion 32. Accordingly, a biasing force to rotate the main body cover 23 upward (to rotate the fixing cover 22 downward) may be generated. When the main body cover 23 is rotated upward, the pressing portion 32 may be moved together with the main body cover 23. Accordingly, the compression spring 30 may be expanded and a biasing force may be gradually reduced.

When a user carries the cutting device 2 together with the dust collection cover 20 holding and/or grasping the handle 6, the fixing cover 22 is rotated downward with respect to the main body cover 23, and the fixing cover 22 may be hung on the main body cover 23 via the rotary support shaft 24 by a biasing force of the compression spring 30. On the contrary, when a cutting operation is to be performed, a cutting surface W of the material to be cut may be brought into contact with the base 21, and accordingly the fixing cover 22 may not be moved with respect to the cutting surface W. In other words, the fixing cover 22 may not be hung on the main body cover 23, and the main body cover 23 may be rotated in the upward and downward direction together with the cutting device 2 with respect to the fixing cover 22. In this way, a rotation reference, i.e., the fixing cover 22 or the main body cover 23, both of which are rotatably coupled with each other, may be changed between when the user carries the cutting device 2 and when the user performs a cutting operation. In the explanation of this specification, a rotation reference may be exchanged as needed. Furthermore, in this specification, regarding a rotation operation of the main body cover 23 with respect to the fixing cover 22, a direction in which the rotary cutting blade 15 protrudes below a lower surface of the base 21 may be referred to as a closing direction, and a direction in which a protruding amount of the rotary cutting blade 15 that protrudes below the lower surface of the base 21 is reduced may be referred to as an opening direction. Accordingly, a downward movement of the main body cover 23 (a movement in which the main body cover 23 is approached to the fixing cover 22) may be referred to as a rotation movement in a closing direction, and an upward direction of the main body cover 23 (a movement in which the main body cover 23 is spaced away from the fixing cover 22) may be referred to as a rotation movement in an opening direction.

Figure 1:
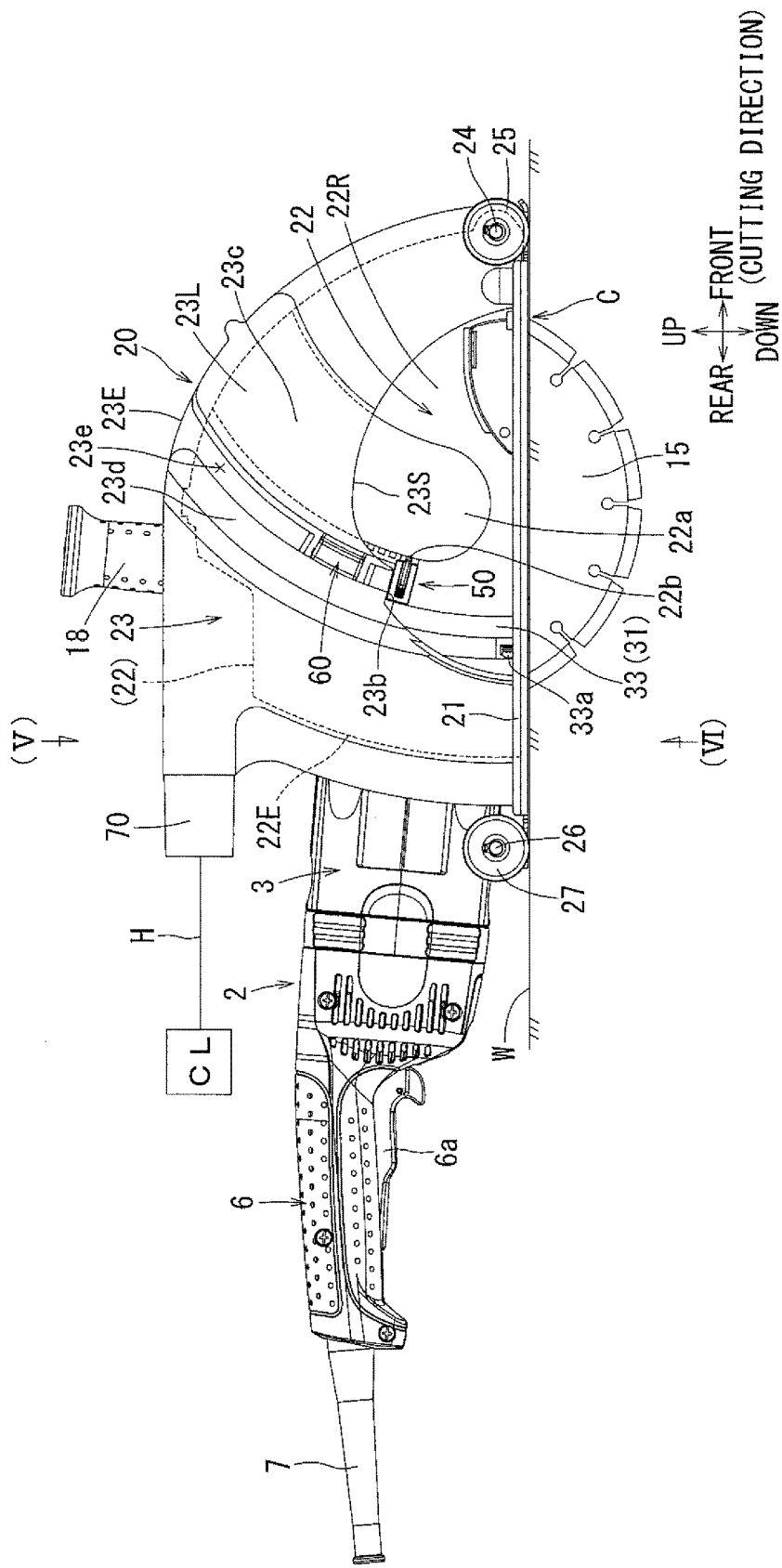
FIG. 1 is a front view of a dust collection cover, showing a right side thereof with respect to a cutting direction, according to one exemplary embodiment of the present disclosure in a state where a main body cover is located in a lower end.
Figure 3:
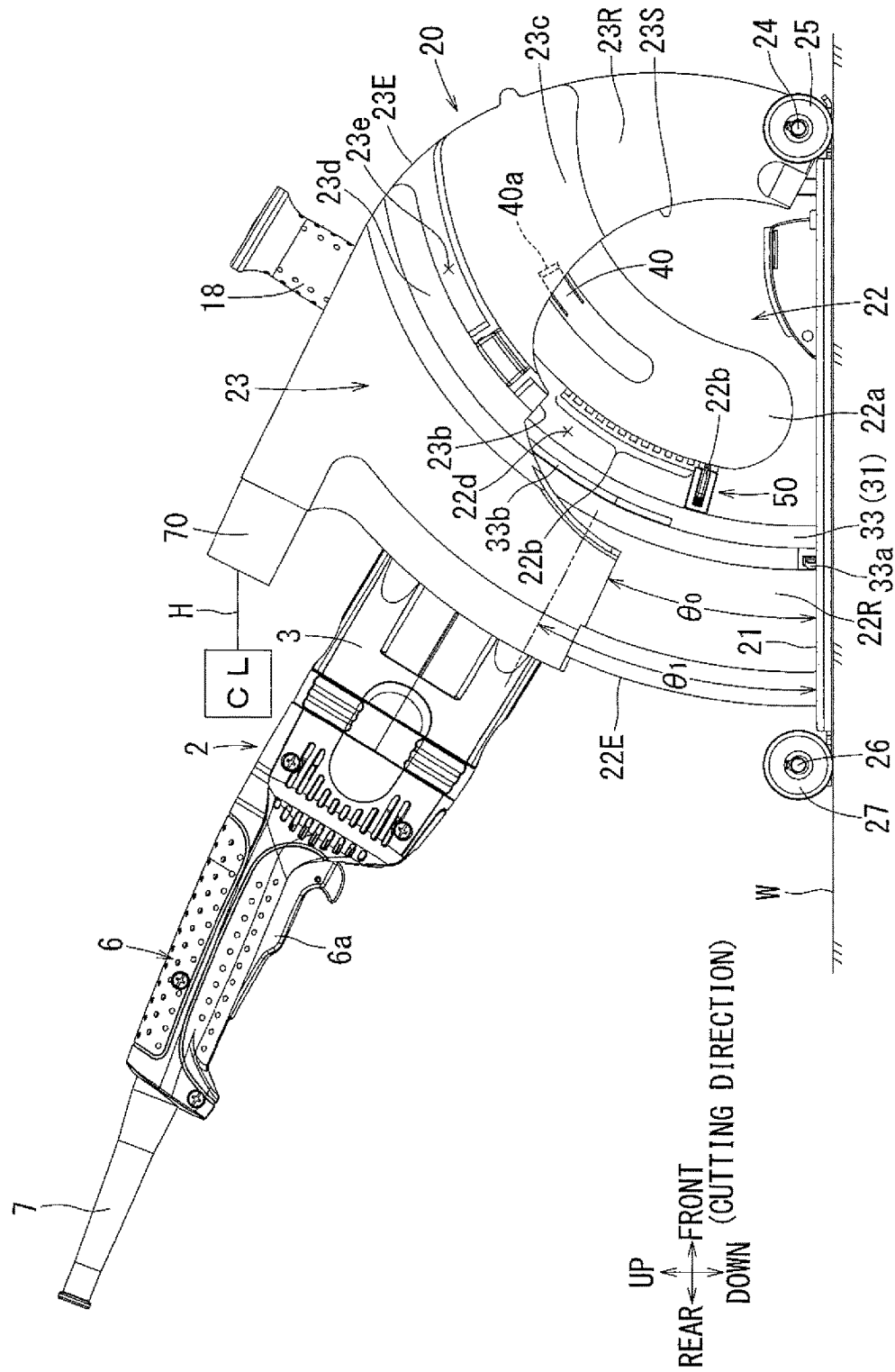
FIG. 3 is another front view of the dust collection cover in a state where the main body cover is located at (returned to) an opening restriction angle
Figure 4:
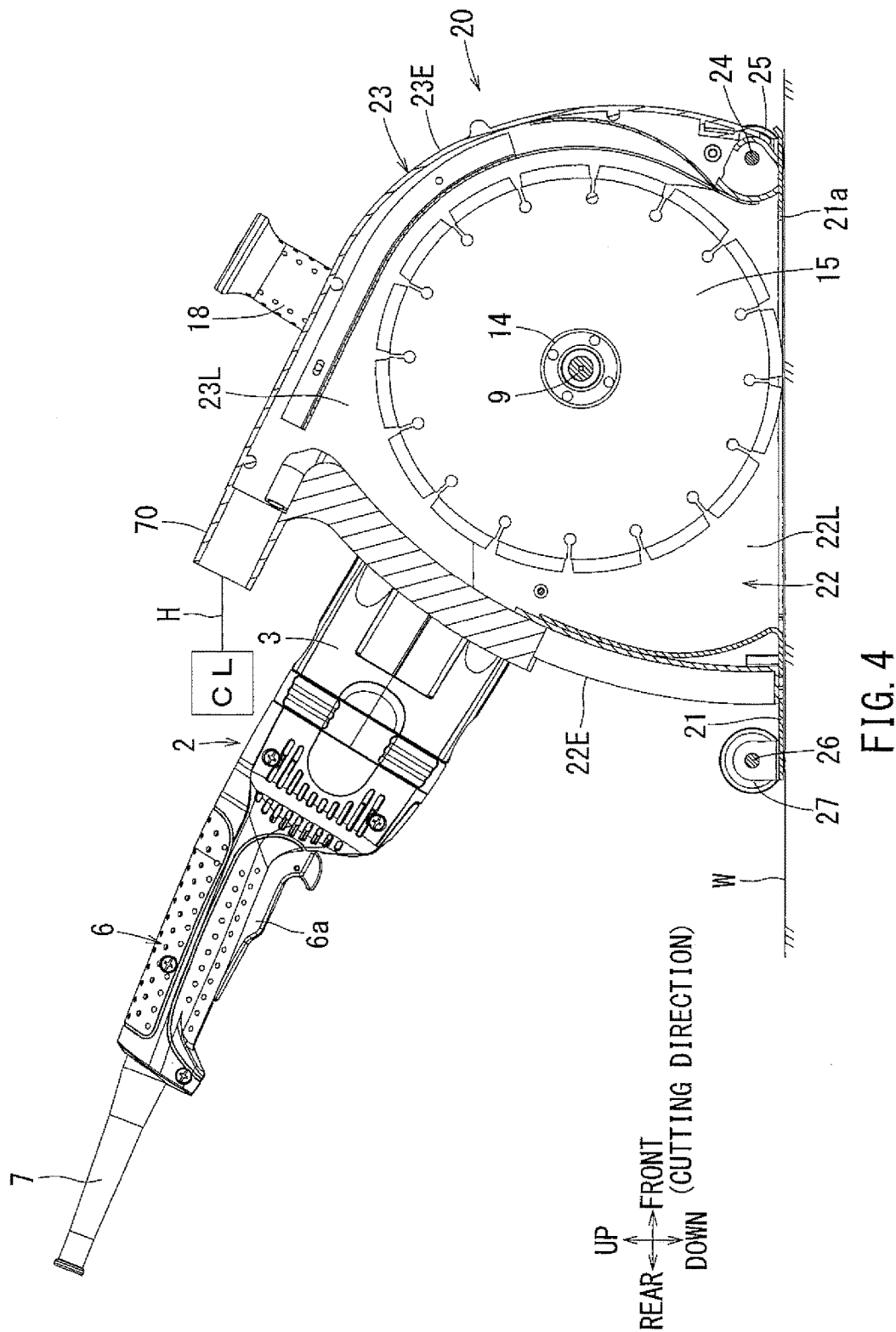
FIG. 4 is another partial vertical cut-away view of a cutting device in a state where the main body cover is located at (returned to) the opening restriction angle.
Figure 5:
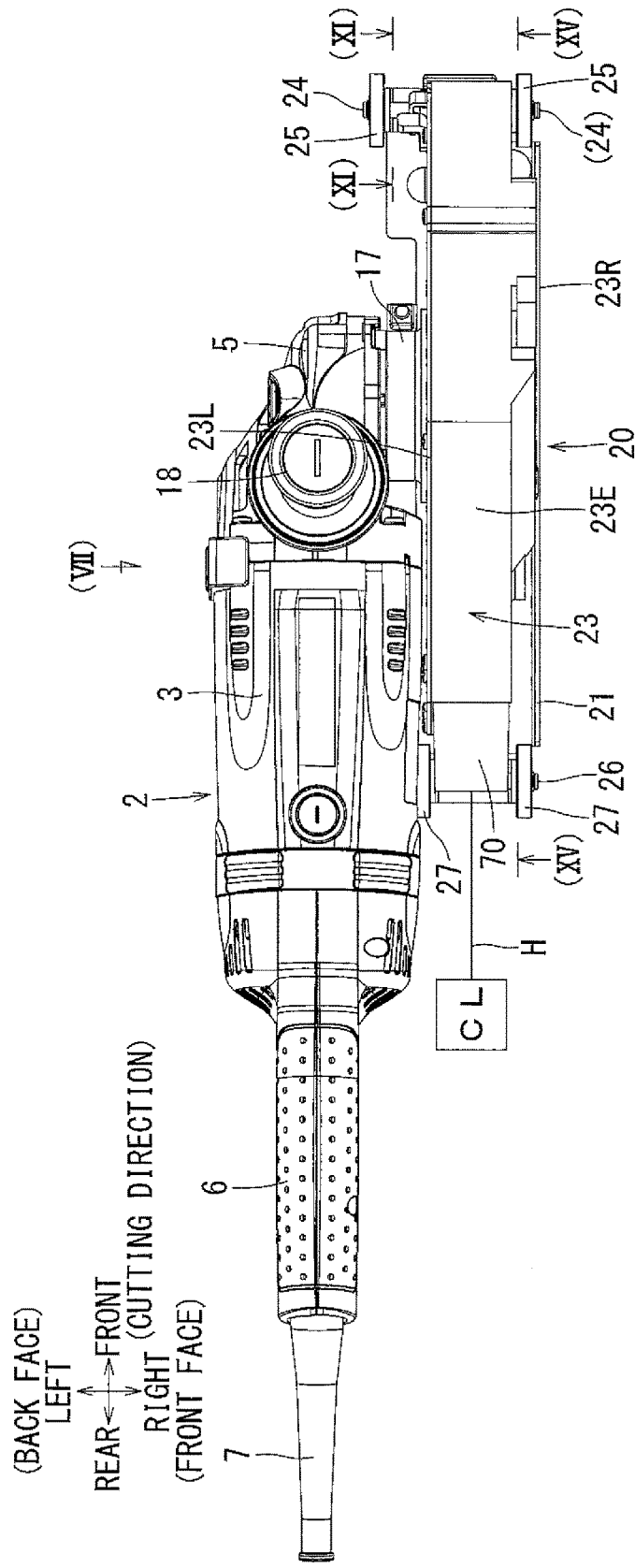
FIG. 5 is a top view of the dust collection cover and the cutting device, which is viewed from a direction indicated by an arrow (V) in FIG. 1.

The main body cover 23 to which the cutting device 2 is attached may be biased by a biasing force of the compression spring 30 in a direction such that the main body cover 23 is rotated upward with respect to the fixing cover 22. As shown in FIGS. 15 and 16, a biasing force may be generated by an upper end portion of the compression spring 30 being pressed against the pressing portion 32. As shown in FIGS. 3 and 4, when the main body cover 23 is rotated in an upward direction to a predetermined angle (an opening restriction angle $\theta_0$ in the present embodiment) with respect to the fixing cover 22, a lower part of the rotary cutting blade 15 may not protrude below a lower surface of the base 21 and may be completely housed in and/or covered with the dust collection cover 20. On the other hand, as shown in FIG. 1, when the main body cover 23 is pressed against a biasing force of the compression spring 30 with the handle 6 held, the rotary cutting blade 15 may protrude below the lower surface of the base 21 and may cut into the cutting surface W of the material to be cut.

When the main body cover 23 is rotated upward with respect to the fixing cover 22 to a large extent, the pressing portion 32 may be retreated from within the spring retaining portion 31 through the pressing portion entering path 33b. When the pressing portion 32 is retreated from within the spring retaining portion 31, the compression spring 30 may be furthermore expanded and an upper end of the compression spring 30 may contact the removal prevention portion 33c. Thus, the compression spring 30 may remain within the spring retaining portion 31. Because of this construction, when the main body cover 23 is rotated downward after that, the pressing portion 32 may be entered into the spring retaining portion 31 through the pressing portion entering path 33b. The upper end of the compression spring 30 may be pressed again by the pressing portion 32 to generate a biasing force to rotate the main body cover 23 upward.

As shown in FIGS. 3 and 4, when the main body cover 23 is rotated upward with respect to the fixing cover 22 to a predetermined angle (the opening restriction angle $\theta_0$ in the present embodiment), a further rotation of the main body cover 23 upward may be restricted by an opening stopper 40. As shown in FIG. 3, a stepped part 22a, which may be configured to be one step higher than the other part, may be formed on the right side inner wall 22R of the fixing cover 22. The stepped part 22a may be formed in a curved manner along an arc centering on the rotary support shaft 24. The opening stopper 40 may be formed in the center of the stepped part 22a. The opening stopper 40 may be formed in a cut and raised shape when the fixing cover is formed, and also an engaging claw 40a may be formed at a tip end of the opening stopper 40. The engagement claw 40a may be engaged with an engagement portion that is formed in an inner surface of the right side outer wall 23R of the main body cover 23, so that a relative rotation of the fixing cover 22 with respect to the main body cover 23 in an opening direction may be restricted.

Owing to the opening stopper 40, for example, when a user carries the cutting device 2 together with the dust collection cover 20 with the handle 6 held, a rotation of the fixing cover 22 with the main body cover 23 may be restricted within the predetermined angle, and accordingly, the fixing cover 22 may be hung on the main body cover 23 via the rotary support shaft 24. Even in this condition, because an angle between the fixing cover 22 and the main body cover 23 may be within the opening restriction angle $\theta_0$, the rotary cutting blade 15 may not protrude below the lower surface of the base 21.

An engagement condition of the engagement claw 40a with the engagement portion of the main body cover 23 may be released by the opening stopper 40 being pushed with a finger of the user. By the release of the engagement claw 40a, the fixing cover 22 may be further rotated with respect to the main body cover 23 in the opening direction beyond the opening restriction angle $\theta_0$. In more detail, by the release of the engagement claw 40a of the opening stopper 40, the fixing cover 22 may be further rotated with respect to the main body cover 23 in the opening direction to an opening angle $\theta_1$ (approximately 45° in this embodiment). Then, the main body cover 23 can be separated from the fixing cover 22, as described later. Furthermore, by separation of the main body cover 23 from the fixing cover 22 from each other, the rotary cutting blade 15 may be exposed to a large extent, and accordingly an operation such as an exchange of the rotary cutting blade etc. can be easily and rapidly performed.

Figure 11:
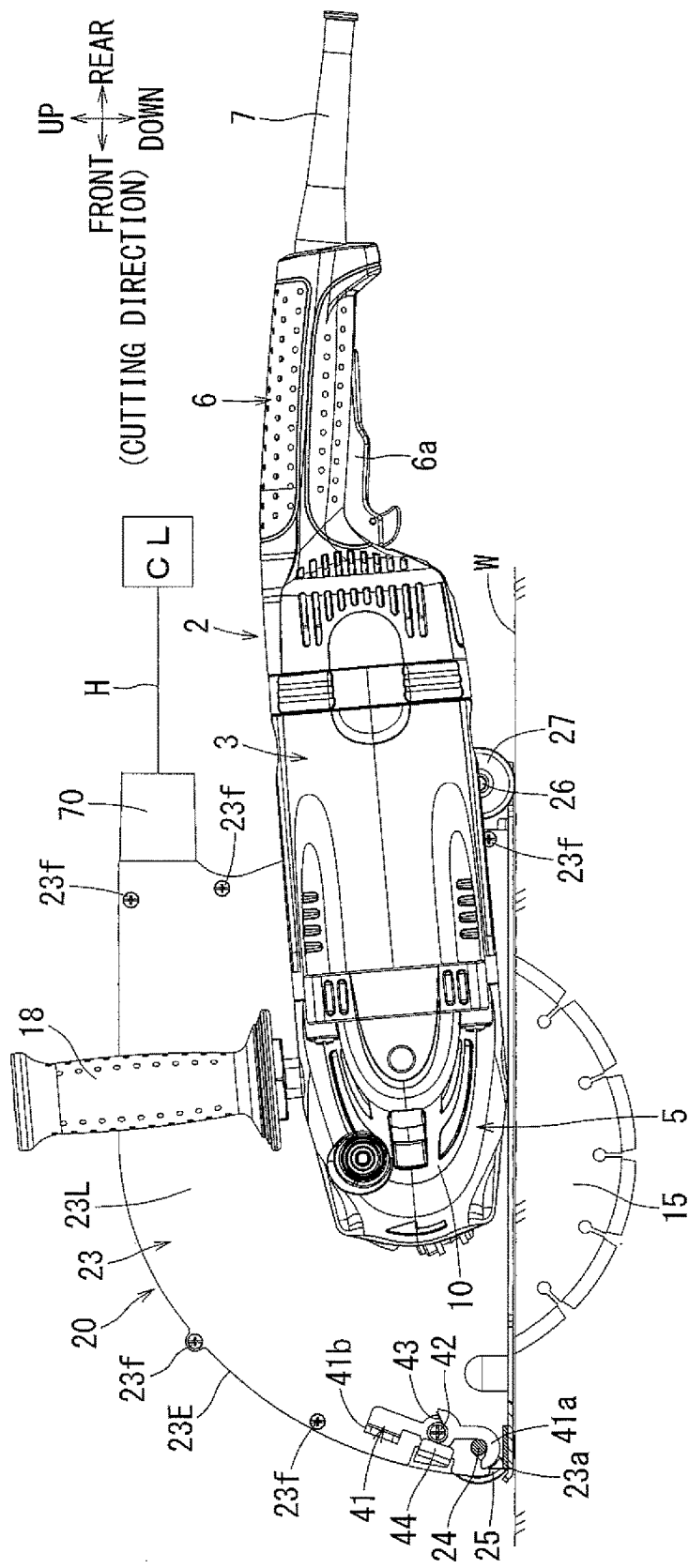
FIG. 11 is a back view of the dust collection cover, in which a front part of the dust cover, especially a separation lock member is shown taken along the line (XI)-(XI) in FIG. 5.
Figure 12:
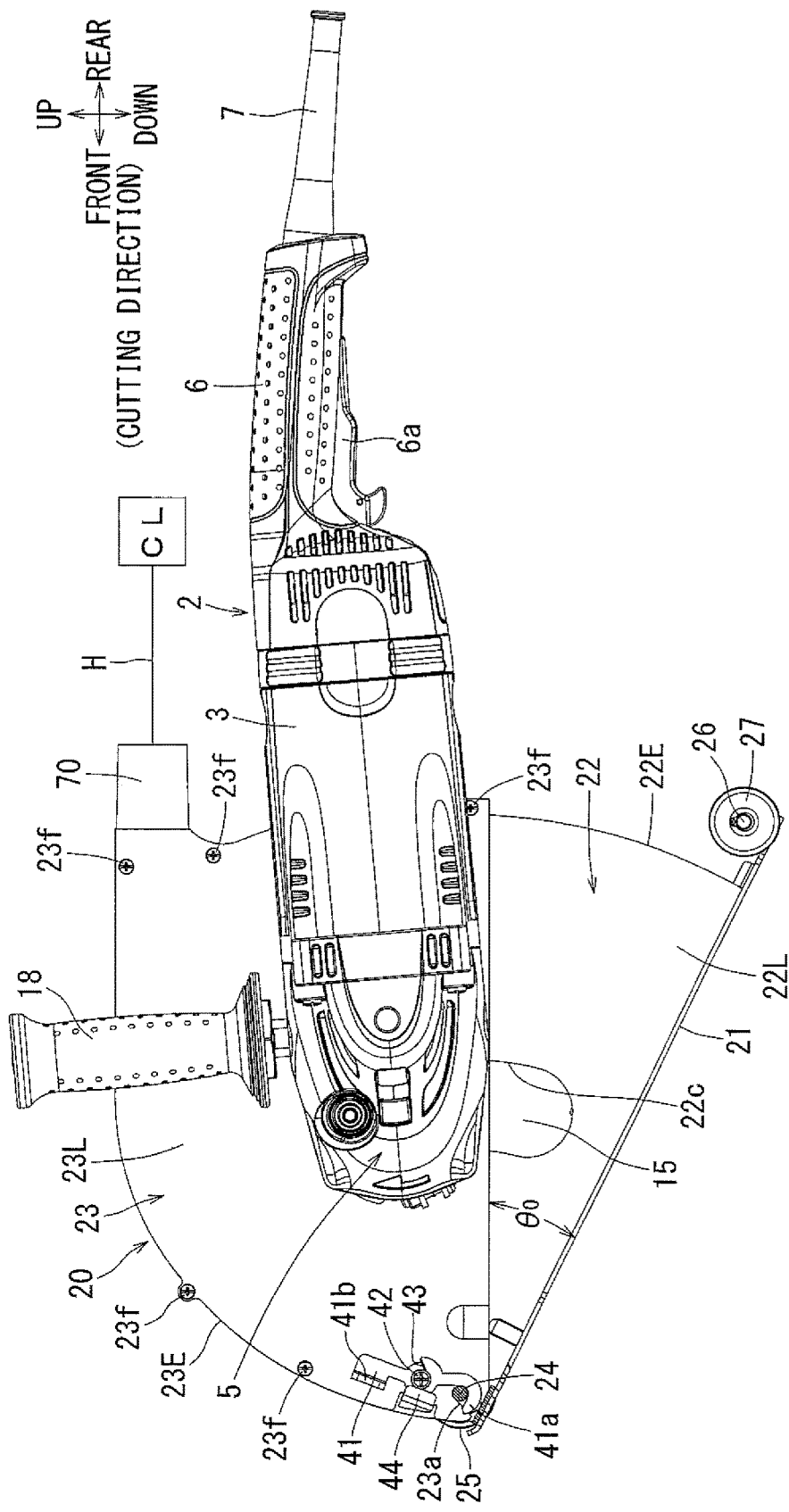
FIG. 12 is another back view of the dust collection cover, in which the main body cover is operated to be opened from a state shown in FIG. 11.
Figure 13:
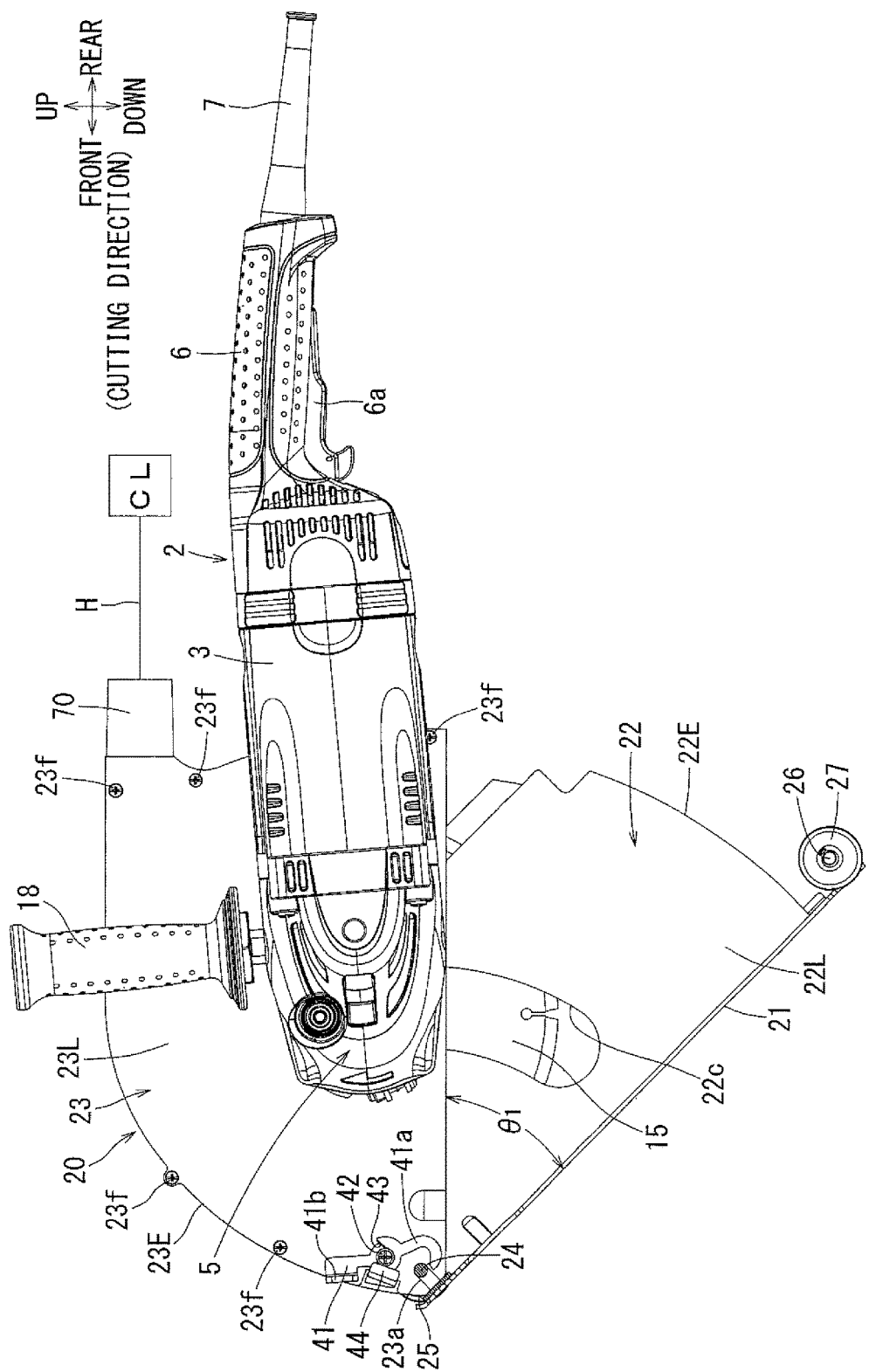
FIG. 13 is another back view of the dust collection cover, in which the separation lock member is operated to an unlock side from a state shown in FIG. 12.
Figure 14:
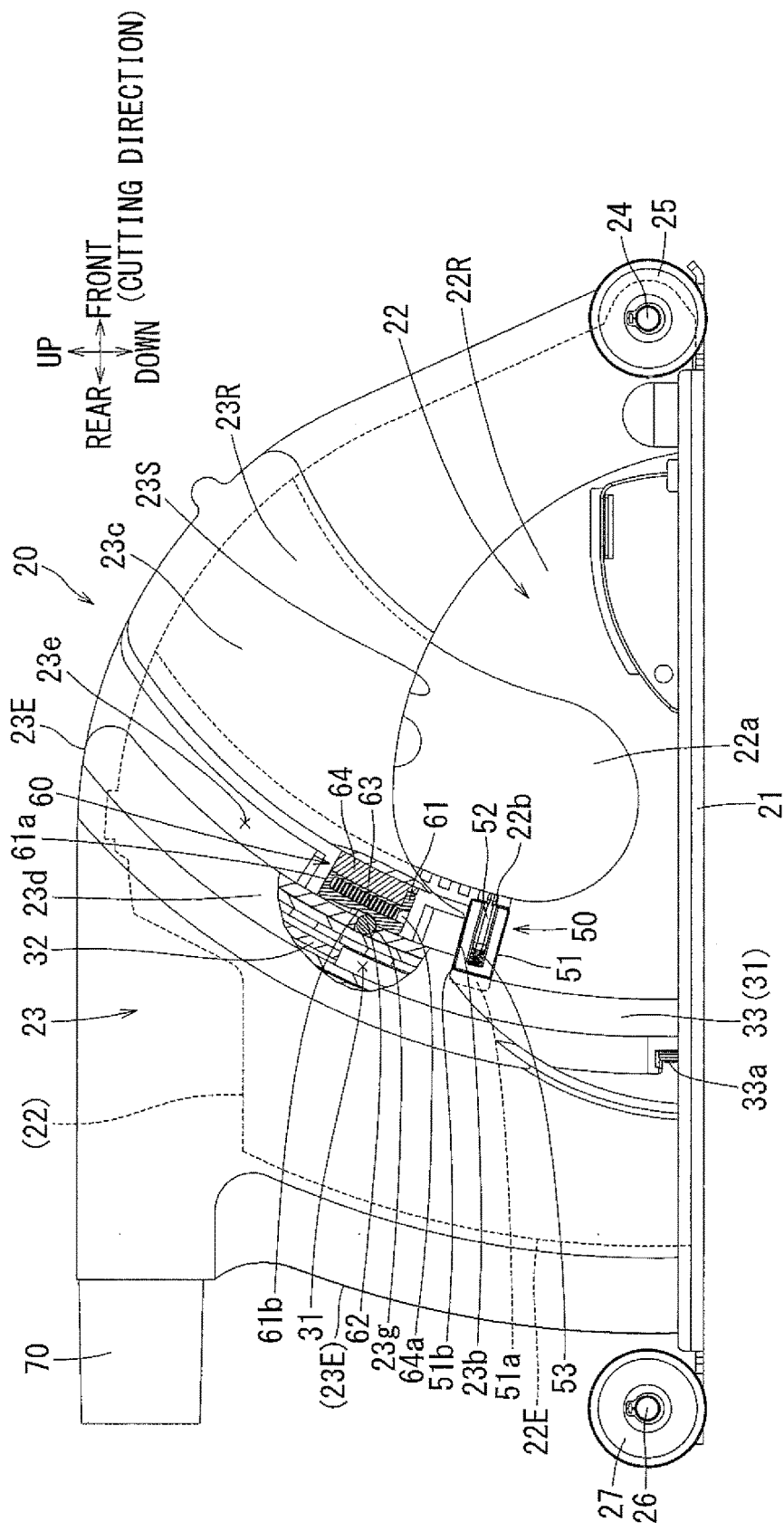
FIG. 14 is a front view of the dust collection cover, in which a fixing stopper and a peripheral area around the fixing stopper are shown in a partial vertical cut-away view with the cutting device removed for clarity.

As shown in FIGS. 11 to 13, a support groove 23a may be formed at a front part of the main body cover 23. The support groove 23a may be symmetrically formed in both the right and left outer wall 23L and 23R. The rotary support shaft 24 may be inserted through the right and left support grooves 23a, and the main body cover 23 may be joined to the fixing cover 22 such that the main body cover 23 may be relatively rotatable with respect to the fixing cover 22. As shown in FIG. 13, the right and left support grooves 23a may be formed by cuts at a front edge portion of the right and left outer walls 23R and 23L, respectively. Because of this construction, the rotary support shaft 24 may be extracted from the left and right support grooves 23a by relatively moving the rotary support shaft 24 with respect to the support grooves 23a in a radial direction. By relatively moving the rotary support shaft 24 with respect to the right and left support grooves 23a to extract the rotary support shaft 24, the fixing cover 22 and the main body cover 23 can be separated from each other.

As shown in FIGS. 11 to 13, a separation lock member 41 for restricting a movement of the rotary support shaft 24 within the support groove 23a in a radial direction of the rotary support shaft 24 may be provided at a front end of the steel, outer wall 23L of the main body cover 23. The separation lock member 41 may be provided so as to be tiltably operable in an upward and downward direction around a support shaft 42. A hook-shaped engagement portion 41a may be formed in a lower part of the separation lock member 41. As shown in FIGS. 11 and 12, the engagement portion 41a may be located below the support shaft 42, and accordingly when the support groove 23a is blocked by the engagement portion 41a, a movement of the rotary support shaft 24 within the support groove 23a in the radial direction may be restricted. By the restriction of the movement of the rotary support shaft 24 within the support groove 23a in the radial direction, the fixing cover 22 may remain to be rotatable with respect to the main body cover 23 in the upward and downward direction.

The separation lock member 41 may be biased by a torsion spring 43 toward a direction such that the engagement portion 41a is located in the lower side of the rotary support shaft 24 (in a clockwise direction in FIGS. 11 to 13). One end of the torsion spring 43 may be hooked by a spring engagement portion 44 provided in the outer wall 23L in a cut and raised shape. An operation portion 41b for rotating the separation lock member 41 in an unlock direction by pushing with a fingertip of the user may be provided at an upper part of the separation lock member 41. As shown in FIG. 13, when the operation portion 41b is pushed by a fingertip of the user to tilt the separation lock member 41 in the unlock direction against the torsion spring 43 (in a counterclockwise direction in FIGS. 11 to 13), the engagement portion 41a may be disengaged from a position where the engagement portion 41a blocked the support groove 23a.

The spring engagement portion 44 may have a function of a spring hook portion for hooking the one end of the torsion spring 43, and also may have a function of a lever stopper for restricting a tilting angle of the separation lock member 41 toward an unlocked side. The spring engagement portion 44 may restrict a tilting angle of the separation lock member 41 toward the unlocked side to a predetermined angle. As shown in FIG. 13, by tilting the separation lock member 41 to the predetermined angle, the engagement portion 41 a of the separation lock member 41 can be completely released from the support groove 23a. Furthermore, it may be configured such that the main body cover 23 can be completely separated from the fixing cover 22 by rotating the fixing cover 22 with respect to the main body cover 23 in the opening direction up to the opening angle $\theta_1$.

When the separation lock member 41 is tilted to the unlock side in a condition where the main body cover 23 is rotated in an opening direction to the opening angle $\theta_1$ (about) 45° with respect to the fixing cover 22, the engagement portion 41 a may be completely released from a position where the support groove 23 is blocked. By the engagement portion 41a being completely released from the support groove 23a, the rotary support shaft 24 may be allowed to move relatively in the radial direction (in an extraction direction) within the support groove 23a. When the main body cover 23 or the fixing cover 22 may be relatively moved in a direction such that the rotary support shaft 24 is released from within the support groove 23a in a condition that the separation lock member 41 is tilted to the unlock side, the main body cover 23 can be relatively separated from the fixing cover 22. Furthermore, when the main body cover 23 is separated from the fixing cover 22, a screw axis 9a of the spindle 9, an outer flange 14, and the rotary cutting blade 15 may be exposed at the side of the outer wall 23 R of the main body cover 23 below an operation window 23S that is formed in a largely cut out, a half circular shape as shown in, for example, FIG. 17. Below the operation window 23S, the user can easily and rapidly perform an operation such as an exchange of the rotary cutting blade 15 etc.

In this way, only through the unlock operation of the separation lock member 41, the fixing cover may be separated from the main body cover 23. In other words, without the unlock operation of the separation lock member 41, the fixing cover and the main body cover 23 may remain in a lock condition. Because of this construction, for example, when the user carries the cutting device 2 together with the dust collection cover 20 holding the handle 6, even if the user accidentally pushes the opening stopper 40 to cause the fixing cover 22 to be rotated (downward) with respect to the main body cover 23 to some extent, the fixing cover 22 may be prevented from releasing and/or falling off from the main body cover 23.

As shown in FIGS. 1, 3, and 14 to 18, a cutting depth adjustment stopper 50 may be provided in the right inner wall 22R of the fixing cover 22 such that the depth adjustment stopper 50 may restrict a lower end position (bottom dead center) of the main body cover 23 to adjust a cutting depth of the rotary cutting blade 15 with respect to the cutting surface W of the material to be cut. Furthermore, the cutting depth adjustment stopper 50 may be provided so as to be movable within a groove 22d that are formed in the fixing cover 22 and between the spring holder 33 and the stepped part 22a of the fixing cover 22. The groove 22d may be formed along an arc centered on the rotary support shaft 24. As shown in FIGS. 14 to 18, the cutting depth adjustment stopper 50 may have a stopper frame 51 in a rectangular block shape and a stopper member 52 so as to be movably supported within the stopper frame 51. Furthermore, the stopper frame 51 may have a support edge part 51a at a rear part thereof. The support edge part 51a may be inserted into a support groove part 33d that is formed in a front surface of the spring holder 33. The support groove part 33d of the spring holder 33 may extend vertically along a curved front surface (a curved inner peripheral surface) of the spring holder 33. The stopper frame 51, and eventually the cutting depth adjustment stopper 50 may be movably supported within a range where the support edge part 51a can be moved within the support groove 33d. The cutting depth adjustment stopper 50 may be prevented from detaching from between the stepped part 22a and the spring holder 33 by positioning the support edge part 51 a of the stopper frame 51 within the support groove part 33d of the spring holder 33.

The stopper member 52 may be movably supported with respect to the stopper frame 51 along a radial direction of the rotary support shaft 24. By a compression spring 53 disposed at a bottom of the stopper frame 51, the stopper member 52 may be biased in a direction such that a tip end thereof may protrude forward. Furthermore, engagement grooves 22b may be provided on a rear surface of the stepped part 22a that is to be a front wall of the groove 22d, which is located at a front side of the cutting depth adjustment stopper 50. As shown in the figures, a plurality of engagement grooves 22b may be provided along the rear part of the stepped part 22a. In the present embodiments, the plurality of the engagement grooves 22d may be formed at approximately equal intervals. When the tip end of the stopper member 52 protrudes and is inserted into one of the engaging grooves 22b by a biasing force of the compression spring 53, the cutting depth adjustment stopper 50 may be fixed so as not to be vertically moved. On the other hand, when the stopper member 52 is pushed by a fingertip of the user against the compression spring 53, the tip end of the stopper member 52 may be retreated from the one of the engagement groove 22b. By the retreat of the stopper member 52 by the user's fingertip, the stopper frame 51, and eventually the cutting depth adjustment stopper 50 can be moved in an upward and downward direction. Furthermore, after the tip end of the stopper member 52 is moved vertically at a desired position and is engaged with one of the engagement grooves 22b by the biasing force of the compression spring 53, then the cutting depth adjustment stopper 50 may be fixed at the desired position.

When the main body cover 23 is rotated downward, a stopper contact part 23b, which is to be set at a lower part of the groove 23e and also at a rear part of the operation window 23 S, may be brought into contact with stopper frame 51 of the cutting depth adjustment stopper 50 to restrict a downward movable end position of the main body cover 23 (and the cutting device 2). Owing to the restriction of a downward movable end position of the cutting device 2 and eventually the rotary cutting blade 15 by the cutting depth adjustment stopper 50, a protruding depth of the rotary cutting blade 15 below the lower surface of the base 21 may be restricted. Accordingly, a cutting depth of the rotary cutting blade 15 with respect to the cutting surface W of the material to be cut may be adjusted in a stepwise manner. FIGS. 1, 3, and 14 to 18 show that the cutting depth adjustment stopper 50 is fixed at a lowest position such that the tip end of the stopper member 52 is engaged with the engagement groove 22b that is located at a lowest position. Accordingly, in FIGS. 1, 3, and 14 to 18, a downward movable end position of the main body cover 23 may be set at the lowest position, and accordingly a cutting depth of the rotary cutting blade 15 with respect to the cutting surface W of the material to be cut may be configured to be maximum. Though omitted in the figures, a scale and value corresponding to a cutting depth of the material to be cut may be indicated on each of the engagement grooves 22b.

As described above, the stopper frame 51 may have the rectangular block shape. Furthermore, an inner peripheral surface of the spring holder 33 may be curved in an arc shape centered on the rotary support shaft 24. On the other hand, when the stopper contact part 23b of the main body cover 23 is brought into contact with the upper surface of the stopper frame 51, the stopper frame 51 may be tilted in a counterclockwise direction, with the tip end of the stopper member 52, which is engaged with the engagement groove 22b, as a supporting point. As a result of the tilt of the stopper frame 51 with the tip end of the stopper member 52 as the supporting point, which differs from the rotary support shaft 24, a rear top corner 51b of the stopper frame 51 may be brought into contact with the inner peripheral surface of the spring holder 33 in such a manner as to bite into the inner peripheral surface and to receive a weight of the main body cover 23. Because of this construction, a downward end position of the main body cover 23 can be reliably restricted, and a cutting operation can be rapidly and precisely performed with a desired cutting depth.

Adding to the above described cutting depth adjustment stopper 50, the dust collection cover 20 of the present embodiment may have a fixing stopper 60 for unrotatably fixing the fixing cover 22 with respect to the main body cover 23 at an arbitrary desired angle. Adding to the structure in which the fixing cover 22 is separated relatively from the main body cover 23 as described above, the dust collection cover 20 of the present embodiment may have the fixing stopper 60 for relatively fixing the fixing cover 22 with respect to the main body cover 23 at an arbitrary angle. In this respect, the dust collection cover 20 of the present embodiment may have a new and useful feature. As shown in FIGS. 14 to 18, the fixing stopper 60 may have a base 64, an operation member 61, and a lock pin 62. The right side outer wall 23R of the main body cover 23 may have a stepped cover part 23c that covers the stepped part 22 formed in the right side inner wall 22R of the fixing cover 22 and also may have a holder cover part 23d that covers the spring retaining portion 31 provided in the right side inner wall 22R of the fixing cover 22. The stepped cover part 23c and the holder cover part 23d may be formed to rise in a lateral direction. Furthermore, a groove 23e that is curved in an arc shape may be formed between the stepped cover part 23c and the holder cover part 23d. The groove 23e may enter into and/or fit into the groove 22d of the fixing cover 22. A lower end of the groove 23e may correspond to the stopper contact part 23b that is brought into contact with the above mentioned cutting depth adjustment stopper 50.

The fixing stopper 60 may be disposed within the groove 23e. The base 64 may be inserted to the groove 23e to be fixed (in the groove 23e). A slide groove part may be formed at a front side of the base 64. The operation member 61 may be retained so as to be vertically slidable on the base 64 in a predetermined area. Furthermore, a slide edge portion may be formed at a lateral part of the operation member 61 at a front side thereof. The slide edge portion may be entered into the slide groove part, and the operation member 61 may be slidably supported vertically with respect to the base 64 within the predetermined area. Furthermore, the operation member 61 may be biased by a compression spring 63 in a direction to slide upward. The operation member 61 may be slid toward a lower direction against the compression spring 63 by a fingertip of the user. When the operation member 61 is slid toward a lock position side (toward a lower direction), an opening/closing operation of the fixing cover 22 with respect to the main body cover 23 may be locked, and a position of the rotary cutting blade 15 may be fixed.

An operation groove 61b may be formed on a rear surface side (a lateral surface) of the operation member 61. As shown in FIGS. 14 to 18, the operation groove 61b may be formed to have a large depth at a lower part thereof and to have a smaller depth toward an upper side. A lock pin 62 may be located and/or placed facing the operation grove 61b. Furthermore, the lock pin 62 may be retained in a retaining hole 23g that is formed in the holder cover part 23d of the main body cover 23. The retaining hole 23g may be formed passing through a front wall of the holder cover part 23d. The lock pin 62 may have a larger diameter than at least a thickness of the front wall of the holder cover part 23d. Because of this construction, the lock pin 62 may protrude toward a thickness direction from the front wall part of the holder cover part 23d.

Figure 17:
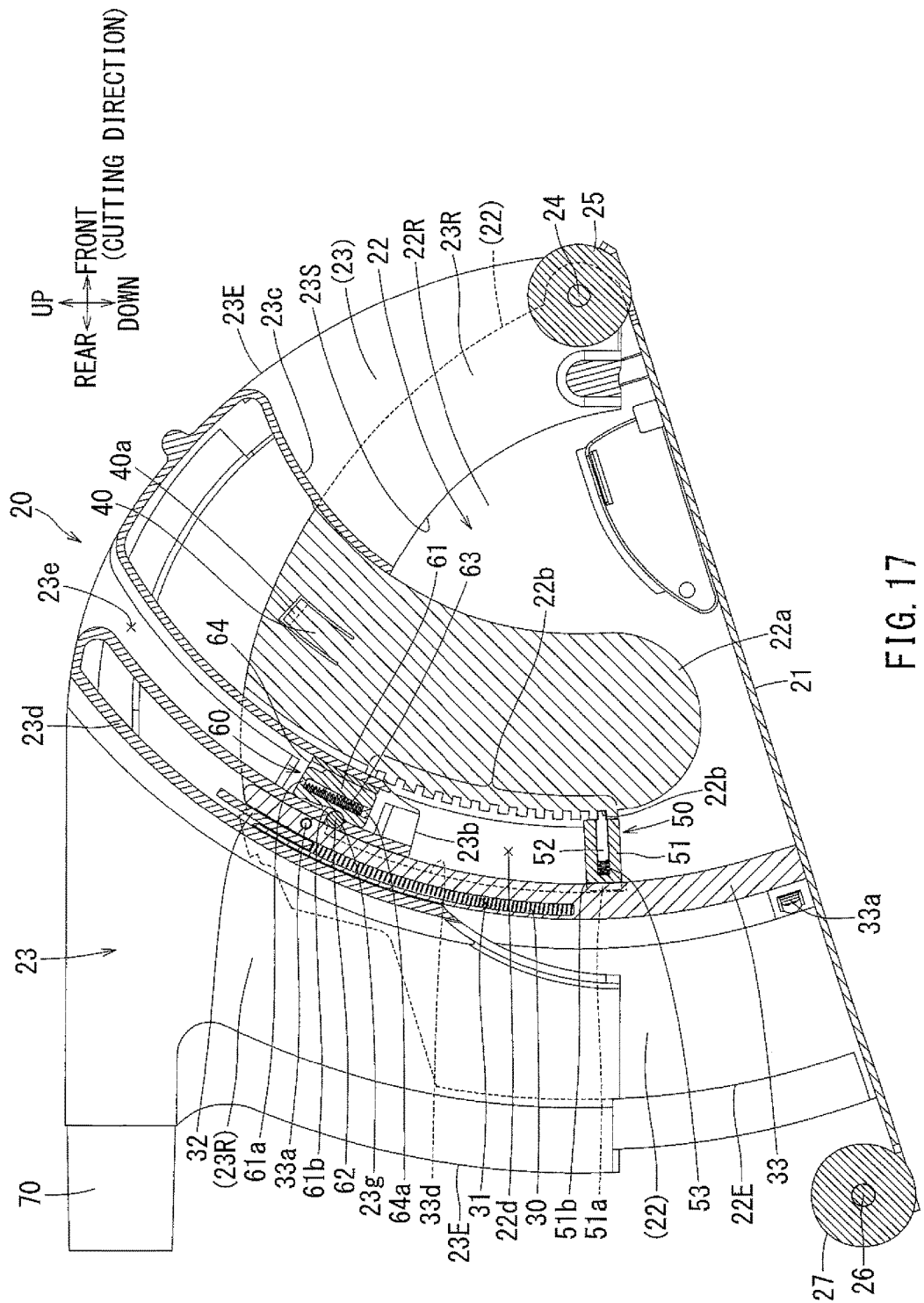
FIG. 17 is another front, and partial cut-away view of the dust collection cover with the cutting device removed for clarity, showing a state where the fixing stopper is unlocked.
Figure 18:
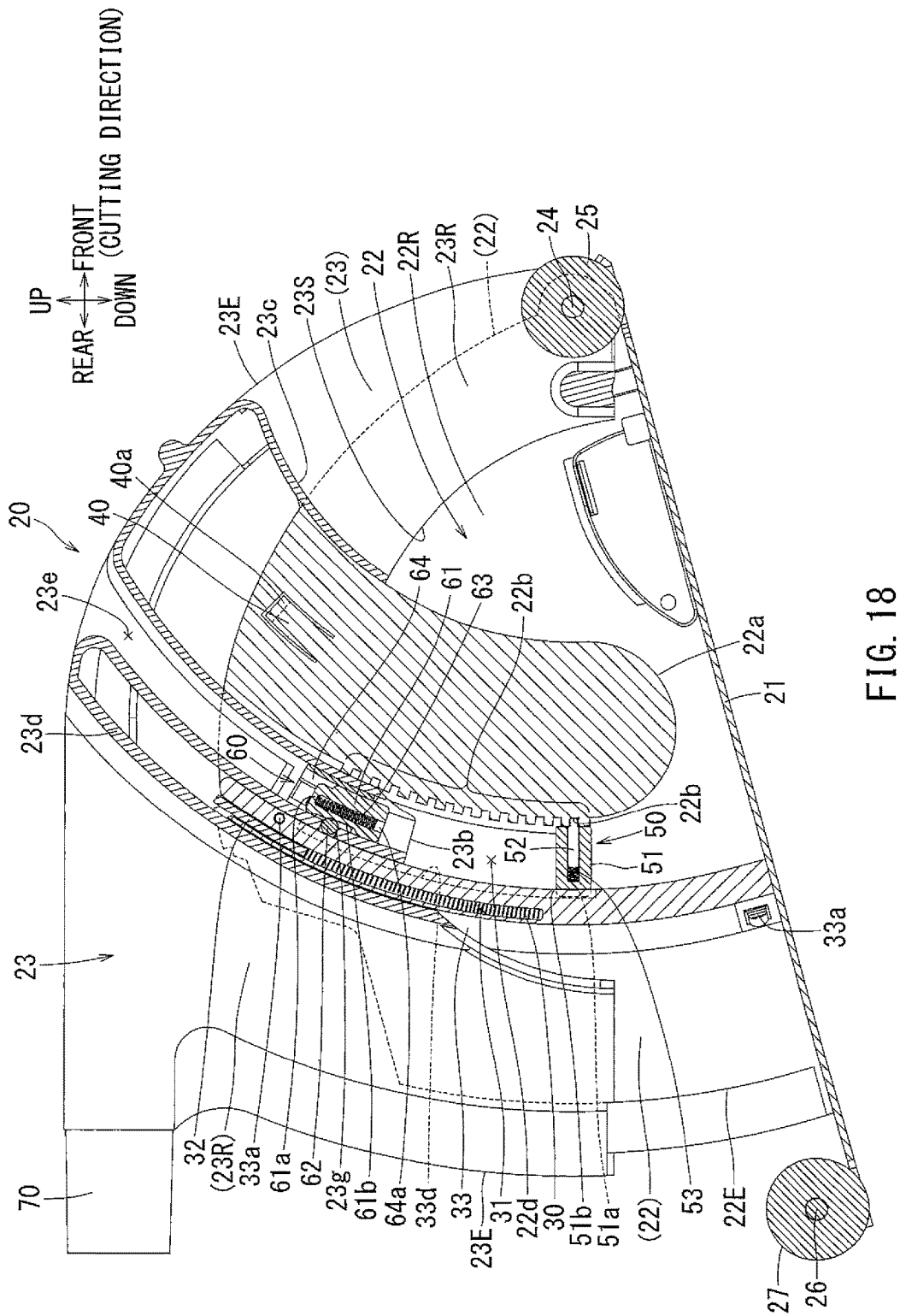
FIG. 18 is another front, and partial cut-away view of the dust collection cover with the cutting device removed for clarity, showing a state where the fixing stopper is locked.

As shown in FIG. 17, in a state where the operation member 61 is positioned in an unlock position, which is an upper position, by a biasing force of the compression spring 63, the lock pin 62 may be placed at a lower, deep position of the operation groove 61b. In other words, the lock pin 62 may enter into the lower, deep position (area) of the operation groove 61b and may not protrude to an inner side of the holder cover part 23d. On the other hand, as shown in FIG. 18, when the operation member 61 is slid to a lower position, i.e. a lock position, against the biasing force of the compression spring 63, the lock pin 62 may be placed at an upper, shallow position (area) of the operation groove 61b. Due to the shallow position (area) of the operation groove 61b, the lock pin 62 may be pushed to protrude to the inner side of the holder cover part 23d.

Regarding an arbitrary and relative rotation position (opening angle) of the main body cover 23 with respect to the fixing cover 22, when the operation member 61 is slid toward the lock position (downward direction) and the lock pin 62 is pressed by the shallow position (area) of the operation groove 61b toward the inner side of the holder cover part 23d, the lock pin 62 may be pressed toward a front surface of the spring holder 33 as shown in FIG. 18. In this way, the lock pin 62 may be strongly held between (bitten into) the operation groove 61b at the side of the main body cover 23 and the front surface of the spring holder 33 at the side of the fixing cover 22. Thus, a downward rotation of the main body cover 23, or an upward rotation of the fixing cover 22 may be restricted, and an opening angle of the main body cover 23 with respect to the fixing cover 22 may be locked at an arbitrary (desired) angle. The operation member 61 may be retained in a lock position by the lock pin 62 being bitten into the front side of the spring holder 23.

Similarly to the cutting depth adjustment stopper 50, the fixing stopper 60 may have a function of adjusting a protruding amount of the rotary cutting blade 15 below the lower surface of the base 21, i.e., the cutting surface W of the material to be cut. To be more specific, the cutting depth adjustment stopper 50 may have a function of adjusting a cutting depth in a stepwise manner, while the fixing stopper 60 may have a function of adjusting a cutting depth in an arbitrary manner, i.e. the fixing stopper 60 may fix the rotary cutting blade 15 to an arbitrary position.

A cutting depth set by the cutting depth adjustment stopper 50 may serve as an upper limit when a cutting depth of the rotary cutting blade 15 with respect to the cutting surface W of the material to be cut is gradually increased by moving the main body cover 23 during a downward direction. On the other hand, a cutting depth set by the fixing stopper 60 may be effective in a cutting mode where a predetermined protruding amount of the rotary cutting blade 15 is protruded below the lower surface of the base 21 from the beginning before a cutting operation, i.e. without a downward movement of the main body cover 23 during a cutting operation.

When the operation member 61 retained at a lock position is pushed upward, the locked state (the bitten state) of the lock pin 62 with respect to the shallow position of the operation groove 61b may be released, and the operation member 61 may be returned to an upper, unlock position by the biasing force of the compression spring 63.

A dust collection port 70 may be provided at a rear part of the main body cover 23 for connecting a dust collector CL. The dust collector CL may be connected to the dust collection port 70 through a dust collection hose H. The dusts and/or debris generated at the cutting position C may be blown up within the dust collection cover 20 by a swirling air generated by a rotation of the rotary cutting blade 15. After that, the dusts and/or debris may be collected by the dust collector CL, such that the dusts and/or debris can be prevented from being scattered around.

According to the dust collection cover 20 thus constructed, the compression spring 30 that can bias the fixing cover 22 in an opening direction with respect to the main body cover 23, which are rotatably coupled with each other, may be retained within the spring retaining portion 31 provided in the right inner wall 22R of the fixing cover 22. Furthermore, the compression spring 30 may be retained within the spring retaining portion 31 so as to be expanded and contracted along the arc centered on the rotary support shaft 24. Because of this construction, for example, in an exchange operation of the rotary cutting blade 15, even when the fixing cover 22 is separated from the main body cover 23, the compression spring 30 may be retained within the spring retaining portion 31. Accordingly, when the fixing cover 22 is reassembled to the main body cover 23, the compression spring 30 may not have to be assembled and/or restored to the condition prior to the separation, and thus operability in exchanging the rotary cutting blade 15 etc. can be improved.

Furthermore, because the compression spring 30 is retained so as to be expanded and contracted along the arc centered on the rotary support shaft 24, an expansion and contraction direction of the compression spring 30 may correspond to an opening direction of the fixing cover 22 with respect to the main body cover 23. Because of this construction, a contact position of the compression spring 30 with respect to the main body cover 23 may not change, and also biasing direction of the compression spring 30 with respect to the fixing cover 22 and the main body cover 23 may be fixed all the time. Accordingly, a biasing force for an opening direction may be stably applied to both the fixing cover 22 and the main body cover 23.

Furthermore, the compression spring 30 may be retained opposite to the rotary support shaft 24 with respect to the rotation center of the rotary cutting blade 15, and accordingly the compression spring 30 may be disposed far from the rotary support shaft 24. Because of this construction, the compression spring 30 that is long in the free length and large in expansion and contraction amount can be easily arranged, and accordingly a degree of freedom in designing the compression spring may be increased.

Furthermore, the compression spring 30 may be retained in the right side inner wall 22R of the fixing cover 22, opposite to the cutting device 2 with respect to the rotary cutting blade 15 in a direction of the plate thickness. Because of this construction, a space that is necessary to locate the spring retaining portion 31 for retaining the compression spring 30 may be obtained more easily compared to a case where the spring retaining portion 31 is located at a side of the cutting device 2. Thus, a degree of freedom in arranging a position and space of the spring retaining portion 31 may be increased.

Furthermore, according to the embodiment thus exemplified, the removal prevention portion 33c for preventing the compression spring 30 from coming out of the spring holder 33 may be provided. According to the removal prevention portion 33c, even when the fixing cover 22 is separated from the main body cover 23, the compression spring 30 may be retained within the spring retaining portion 31. Because of this construction, when the once separated fixing cover 22 is coupled to the main body cover 23 again, the compression spring 30 may not have to be assembled and/or restored to the condition prior to the separation. In this respect, operability in exchanging the rotary cutting blade 15 etc. can be improved.

Furthermore, according to the embodiment thus exemplified, the pressing portion 32 that can press the compression spring 30 to generate a biasing force may be formed in the main body cover 23, and it may be configured such that the pressing portion 32 may be entered into an inside of the spring retaining portion 31, via the pressing portion entering path 33b provided in the removal prevention portion 33c, to press one end of the compression spring 30. According to the pressing portion entering path 33b, when the fixing cover 22 is coupled to the main body cover 23, the pressing portion 32 can be easily and rapidly brought into contact with the one end of the compression spring 30. In this respect, operability in exchanging the rotary cutting blade 15 etc. can be improved.

Furthermore, according to the dust collection cover 20 thus constructed, the cutting depth adjustment stopper 50 may be located between the fixing cover 22 and the main body cover 23. Furthermore, the downward end position of the main body cover 23 with respect to the fixing cover 22, i.e., the rotation end position in the closing direction may be restricted by the cutting depth adjustment stopper 50. By restricting the downward end position of the main body cover 23, a cutting depth of the rotary cutting blade 15 with respect to the cutting surface W of the material to be cut may be restricted. The cutting depth adjustment stopper 50 may be positioned at a plurality of positions, and thus a cutting depth of the rotary cutting blade 15 can be finely adjusted, and operability of the cutting device can be improved.

The tip end of the stopper member 52 may be engaged with one of the engaging grooves 22b by the biasing force of the compression spring 53, such that the cutting depth adjustment stopper 50 can be positioned. Because of this construction, vibration etc. may not cause a positional displacement of the once adjusted cutting depth adjustment stopper 50. Furthermore, the cutting depth adjustment stopper 50 can be easily and rapidly positioned by retreating the stopper member 52 against the compression spring 53 and engaging it again with one of the engaging grooves 22b.

Furthermore, the cutting depth adjustment stopper 50 of the present teachings may be provided so as to positioned within the groove 22d that is provided along the arc centered on the rotary support shaft 24. Because of this construction, wherever the cutting depth adjustment stopper 50 is positioned, the cutting depth adjustment stopper 50 may be brought into contact with the same part of the main body cover 23 (the stopper contact part 23b). Accordingly, the cutting depth adjustment stopper 50 may receive a tare weight of the main body cover 23 and an impact by a downward rotation of the main body cover 23, such that a rotation of the main body cover 23 in the closing direction may be reliably restricted.

According to the cutting depth adjustment stopper 50 thus exemplified, the stopper frame 51 may receive the tare weight of the main body cover 23 and be tilted centered on the supporting point (the tip end of the stopper member 52), which differs from the rotary support shaft 24, and the rear top corner 51b of the stopper frame 51 may be engaged with and/or bitten into the inner peripheral surface of the spring holder 33 that is curved along the arc centered on the rotary support shaft 24. Thus, it is configured such that a position of the stopper frame 51 may be locked to restrict a downward end position of the main body cover 23. By the simple configuration in which the rear top corner 51b of the stopper frame 51 is bitten into the inner peripheral surface of the spring holder 33, the downward end position of the main body cover 23 once set may be reliably retained, and eventually an adjustment condition of the cutting depth of the rotary cutting blade 15 may be reliably maintained.

The cutting depth adjustment stopper 50 may be supported so as to be moved along the groove 22d with the support edge part 51a of the stopper frame 51 being entered into the support groove part 33d. The arc-shaped spring holder 33 may be attached to the right side inner wall 22R of the fixing cover 22, and accordingly the support groove 22d may be located between the spring holder 33 and the right side inner wall 22R. By attaching the spring holder 22 to the right side inner wall 22R of the fixing cover 22, the cutting depth adjustment stopper 50 may be located and/or assembled in the groove 22d. In this way, the cutting depth adjustment stopper 50 may be located and/or assembled by utilizing the spring holder 33. Thus, compared to a configuration in which the cutting depth adjustment stopper 50 is assembled and/or located so as not to be removed from the groove 22d by utilizing other members, an assembling configuration of the cutting depth adjustment stopper 50 may be simplified.

Furthermore, according to the dust collection cover 20 of the embodiments thus constructed, the fixing stopper 60 for locking a rotation of the main body cover 23 with respect to the fixing cover 23 may be provided between the fixing cover 22 and the main body cover 23. By the fixing stopper 60, a rotation of the main body cover 23 with respect to the fixing cover 22 may be locked at an arbitrary opening/closing angle, and thus a protruding amount of rotary cutting blade 15 (a cutting depth with respect to the cutting surface W) below the lower surface of the base 21 may be fixed at the arbitrary amount. A protruding amount of the rotary cutting blade 15 may be fixed by the fixing stopper 60 in the first place, and then by the rotary cutting blade 15 being cut into the cutting surface W from its edge and moving the rotary cutting blade 15 along the cutting surface W of the material to be cut, a cutting operation may be performed precisely and rapidly. In this respect, operability of the cutting device 2 can be improved.

Furthermore, regarding the fixing stopper 60 thus exemplified, the lock pin 62 retained in the retaining hole 23g of the holder cover 23d may be firmly held between (bitten into) the operation groove 61b of the operation member 61 and the spring holder 33 of the fixing cover 22, such that a rotation of the main body cover 23 with respect to the fixing cover 22 may be locked. By the operation member 61 being moved to a lock position, a space between the operation groove 61 and the spring holder 33 may be narrowed and then the lock pin 62 may be firmly held between (bitten into) them. In this way, it may be configured such that the lock pin 62 is firmly held between (bitten into) the fixing cover 22 and the main body cover 23, and accordingly a rotation of the main body cover 23 with respect to the fixing cover 22 is locked. Thus, a relative rotation of the main body cover 23 with respect to the fixing cover 22 can be unrotatably locked at an arbitrary opening/closing angle. Because of this construction, the rotary cutting blade 15 may be locked at an arbitrary cutting depth. In this respect, operability of the cutting device 2 can be improved.

Furthermore, according to the fixing stopper 60 thus exemplified, the operation member 61 may be provided so as to be moved within the groove 23d curved along the arc centered on the rotation support shaft 24. Because of this construction, a movement direction of the operation member 61 may correspond to the rotation direction of both the fixing cover 22 and the main body cover 23. Accordingly, the lock pin 62 may be effectively and firmly held between (bitten into) the fixing cover 22 and the main body cover 23, and a rotation of the main body cover 23 with respect to the fixing cover 22 may be effectively locked. Furthermore, since the movement direction of the operation member 61 may correspond to the rotation direction of both the covers 22 and 23, the user may easily grasp a lock position and/or an unlock position of the operation member 61. In this respect, operability of the dust collection cover 20 can be improved.

Furthermore, according to the fixing stopper 60 thus exemplified, the inner peripheral surface of the spring holder 33 and the operation groove 61b of the operation member 61, between which the lock pin 61 is thinly held, are made of metal. Accordingly, pressed portions pressed by the lock pin 62 may have high durability, and eventually durability of the fixing stopper 60 can be improved.

Furthermore, according to the fixing stopper 60 thus exemplified, the operation member 61 may be biased to an unlock side by the compression spring 63. Accordingly, when the operation member 61, which can be remained in the lock position by the lock pin 62 being bitten into the above described members, is pushed in the unlock direction by a fingertip of the user, the operation member 61 may be reliably and easily returned to the unlock position. Thus, according to the fixing stopper 60 thus exemplified, operability during an unlock operation can be improved, and also the operation member 61 may be prevented from unexpectedly moving to the lock side owing to vibration etc.

The present invention is not limited to the embodiments discussed above and may be further modified without departing from the scope and spirit of the present teachings. For example, in the embodiments discussed above, the spring retaining portion 31 for retaining the compression spring 30 may be provided in the fixing cover 22, and the pressing portion 31 for pressing the compression spring 30 may be provided in the main body cover 23. However, contrary to this configuration, it may be configured such that the spring retaining portion is provided in the main body cover 23 and the pressing portion 32 is provided in the fixing cover 22.

Furthermore, in the embodiments discussed above, the spring retaining portion 31 may be provided in the right side inner wall 22R opposite to the cutting device 2 with respect to the rotary cutting blade 15 in the thickness direction. However, the spring retaining portion may be provided in the left side inner wall 22L, i.e., at a side of cutting device 2. Furthermore, spring retaining portions 31 may be provided in both the left and right inner walls 22L and 22R of the fixing cover 22, and a biasing force may be applied to the fixing cover 22 and the main body cover 23 in the opening direction by a pair of compression springs 30.

Furthermore, in the embodiments discussed above, the cutting depth adjustment stopper 50 for restricting a downward end position of the main body cover 23 may be provided at a side of the fixing cover 22. However, the cutting depth adjustment stopper may be provided at a side of the main body cover 23 so as to be positioned at a plurality of positions, and by contacting a predetermined portion of the fixing cover 22 with respect to the cutting depth adjustment stopper 50 of the main body cover 23, a downward end position of the main body cover 23 can be restricted to finely adjust a cutting depth of the rotary cutting blade 15.

Furthermore, in the above-described embodiments, the cutting depth adjustment stopper 50 may be positioned within the groove 22d that is located between the stepped part 22a of the fixing cover 22 and the spring retaining portion 31. However, instead of this configuration, the cutting depth adjustment stopper 50 may be positioned inside the stepped part 22a, or outside the spring retaining portion 31.

Furthermore, in the embodiments discussed above, the cutting depth adjustment stopper 50 may be positioned within the groove 22d that is provided in the right side inner wall 22R of the fixing cover 22, and the stopper member 52 may be engaged with one of the engagement groove 22b provided on the inner peripheral side wall of the groove 22d. However, instead of this configuration, an engagement pin biased in a lock side direction may be arranged in the stopper frame 51, and by removing and/or inserting the engagement pin from and/or into holes provided in a bottom part of the groove 22d, the cutting adjustment stopper 50 may be positioned at a plurality of positions.

Furthermore, regarding a configuration in which a cutting depth of the rotary cutting blade 15 with respect to the cutting surface W of the material to be cut can be changed at a plurality of stages, for example, a plurality of engagement holes instead of the engagement grooves 22b may be provided in the right side inner wall 22R of the fixing cover 22 along the arc path centered on the rotary support shaft 24, and a downward end position of the main body cover 23 may be restricted by the stopper member 50 inserted to and retained in any one of the engagement holes.

Furthermore, in the embodiments discussed above, in the configuration where the fixing cover 22 is arranged inside the main body cover 23 and the outer wall 23R of the main body cover 23 is located outside the inner wall 22R of the fixing cover 22, the fixing stopper 60 may be provided in the main body cover 23. However, the main body cover 23 can be arranged inside the fixing cover 22, and the fixing stopper 60 for locking a relative rotation of both covers 22 and 23 can be provided in the fixing cover 22.

Furthemore, in the embodiments discussed above, the operation member 61 may be slid along the arc centered on the rotary support shaft 24. However, a dial type operation member for changing between a lock condition and an unlock condition by a rotational operation thereof may be used. In this case, an eccentric portion may be provided in a rotary type operation member, and by the lock pin 62 being firmly held between (being bitten into) the eccentric portion and an arc surface of the spring holder 33, a relative rotation of the main body cover 23 can be locked with respect to the fixing cover 22.

What is claimed is:

1. A dust collection cover for a cutting device, the dust collection cover being configured to cover around a rotary cutting blade of the cutting device, the dust collection cover comprising:
   a first cover configured to be attached to the cutting device; and
   a second cover having a base with which a cutting surface of a material to be cut is brought into contact, wherein:
      the first cover is coupled to the second cover in a front part of the dust collection cover, such that the first cover is relatively opened and closed with respect to the second cover around a rotation support shaft;
      the second cover is biased toward an opening direction by a compression spring so as to be opened with respect to the first cover;
      the compression spring is retained so as to be expanded and contracted along an arc centered on the rotation support shaft, the compression spring being retained in a spring retaining portion provided in the second cover;

the spring retaining portion includes a removal prevention portion for preventing removal of the compression spring; and a pressing portion is provided in the first cover to generate a biasing force to the compression spring, and the pressing portion is entered within the spring retaining portion through a pressing portion entering path provided in the removal prevention portion of the spring retaining portion such that the pressing portion presses one end of the compression spring.

2. The dust collection cover according to claim 1, wherein, when the dust collection cover is attached to the cutting device, the compression spring is retained opposite to the rotation support shaft with respect to a rotation center of the rotary cutting blade.

3. The dust collection cover according to claim 1, wherein, when the dust collection cover is attached to the cutting device, the compression spring is retained opposite to the cutting device with respect to the rotary cutting blade in a thickness direction of the rotary cutting blade.

4. The dust collection cover according to claim 1, wherein, a cutting depth adjustment stopper is provided between the first cover and the second cover such that an opening and closing angle in a closing direction of the first cover with respect to the second cover is configured to be positioned at a plurality of positions to adjust a cutting depth of the rotary cutting blade with respect to the cutting surface of the material to be cut.

5. The dust collection cover according to claim 1, wherein, a fixing stopper for locking a rotation of the first cover with respect to the second cover at an arbitrary position is provided between the first cover and the second cover.

6. A cutting device having the dust collection cover according to claim 1.

* * * * *